(12) United States Patent
Kollodge et al.

(10) Patent No.: US 8,083,820 B2
(45) Date of Patent: Dec. 27, 2011

(54) STRUCTURED FIXED ABRASIVE ARTICLES INCLUDING SURFACE TREATED NANO-CERIA FILLER, AND METHOD FOR MAKING AND USING THE SAME

(75) Inventors: Jeffrey S. Kollodge, Stillwater, MN (US); Julie Y. Qian, St. Paul, MN (US); Jimmie R. Baran, Jr., Prescott, WI (US); William D. Joseph, Maplewood, MN (US); John J. Gagliardi, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 430 days.

(21) Appl. No.: 12/359,817

(22) Filed: Jan. 26, 2009

(65) Prior Publication Data

US 2009/0176443 A1    Jul. 9, 2009

Related U.S. Application Data

(63) Continuation-in-part of application No. 11/671,037, filed on Feb. 5, 2007, now Pat. No. 7,497,885.

(60) Provisional application No. 60/871,720, filed on Dec. 22, 2006.

(51) Int. Cl.
| | |
|---|---|
| *B24D 3/02* | (2006.01) |
| *B24D 3/00* | (2006.01) |
| *B24D 11/00* | (2006.01) |
| *C09C 1/68* | (2006.01) |
| *C09K 3/14* | (2006.01) |
| *B32B 9/00* | (2006.01) |
| *B32B 19/00* | (2006.01) |

(52) U.S. Cl. ............... 51/309; 51/298; 51/307; 428/688; 428/689

(58) Field of Classification Search ............. 51/307, 51/308, 309, 293, 298; 428/688, 689, 702
See application file for complete search history.

(56) References Cited

U.S. PATENT DOCUMENTS

| | | | |
|---|---|---|---|
| 4,314,827 | A | 2/1982 | Leitheiser et al. |
| 4,623,364 | A | 11/1986 | Cottringer et al. |
| 4,744,802 | A | 5/1988 | Schwabel |
| 4,770,671 | A | 9/1988 | Monroe et al. |
| 4,881,951 | A | 11/1989 | Wood et al. |
| 5,014,468 | A | 5/1991 | Ravipati et al. |
| 5,152,917 | A | 10/1992 | Pieper et al. |
| 5,391,210 | A | 2/1995 | Bilkadi et al. |
| 5,645,471 | A | 7/1997 | Strecker |
| 5,692,950 | A | 12/1997 | Rutherford et al. |

(Continued)

FOREIGN PATENT DOCUMENTS

JP      2005-039287 A  *  2/2005

(Continued)

*Primary Examiner* — Jerry Lorengo
*Assistant Examiner* — Noah Wiese
(74) *Attorney, Agent, or Firm* — James A. Baker; Ann Kulprathipanja

(57) ABSTRACT

Structured fixed abrasive articles including a multiplicity of three-dimensional abrasive composites fixed to the abrasive article, the abrasive composites further including a multiplicity of ceria abrasive particles having a volume mean diameter from 100 to 500 nanometers (nm) in a matrix material, the matrix material further including a polymeric binder and a multiplicity of surface treated ceria filler particles having a volume mean diameter less than 100 nm. Also provided are methods of making and using structured fixed abrasive articles according to the disclosure.

20 Claims, 3 Drawing Sheets

U.S. PATENT DOCUMENTS

| | | | |
|---|---|---|---|
| 5,942,015 A | 8/1999 | Culler et al. | |
| 5,958,794 A | 9/1999 | Bruxvoort et al. | |
| 6,007,407 A | 12/1999 | Rutherford et al. | |
| 6,194,317 B1 | 2/2001 | Kaisaki et al. | |
| 6,258,137 B1 | 7/2001 | Garg et al. | |
| 6,287,353 B1 * | 9/2001 | Celikkaya | 51/309 |
| 6,293,980 B2 | 9/2001 | Wei et al. | |
| 6,551,366 B1 | 4/2003 | D'Souza et al. | |
| 6,645,624 B2 | 11/2003 | Adefris et al. | |
| 6,758,727 B2 | 7/2004 | Coad | |
| 6,802,878 B1 * | 10/2004 | Monroe | 51/307 |
| 6,945,851 B2 | 9/2005 | Ward et al. | |
| 7,052,625 B2 | 5/2006 | Chamberlin et al. | |
| 2004/0127045 A1 | 7/2004 | Gorantla et al. | |
| 2005/0178070 A1 * | 8/2005 | Workman et al. | 51/307 |
| 2006/0207187 A1 * | 9/2006 | Gaeta et al. | 51/293 |
| 2008/0148651 A1 | 6/2008 | Kollodge | |

FOREIGN PATENT DOCUMENTS

| | | |
|---|---|---|
| JP | 2009-182344 A * | 8/2009 |
| WO | WO 95/07797 | 3/1995 |
| WO | WO 95/22436 | 8/1995 |

\* cited by examiner

STRUCTURED FIXED ABRASIVE ARTICLES INCLUDING SURFACE TREATED NANO-CERIA FILLER, AND METHOD FOR MAKING AND USING THE SAME

CROSS REFERENCE TO RELATED APPLICATIONS

This application is a continuation-in-part of U.S. application Ser. No. 11/671,037, filed Feb. 5, 2007, now U.S. Pat. No. 7,497,885, which claims the benefit to U.S. Provisional Patent Application No. 60/871,720, filed Dec. 22, 2006, the disclosures of which are incorporated by reference herein in their entirety.

TECHNICAL FIELD

This disclosure relates to structured fixed abrasive articles including sub-micrometer ceria abrasive particles and surface treated nano-ceria filler particles and methods for making and using these articles. The disclosure further relates to use of the structured fixed abrasive articles in chemical mechanical planarization (CMP) processing of substrates.

BACKGROUND

Abrasive articles are frequently used for microfinishing applications such as semiconductor wafer polishing, microelectromechanical (MEMs) device fabrication, finishing of substrates for hard disk drives, polishing of optical fibers and connectors, and the like. For example, during integrated circuit manufacture, semiconductor wafers typically undergo numerous processing steps including deposition of metal and dielectric layers, patterning of the layers, and etching. In each processing step, it may be necessary or desirable to modify or refine an exposed surface of the wafer to prepare it for subsequent fabrication or manufacturing steps. The surface modification process may be used generally to modify deposited conductors, e.g. metals, semiconductors, and/or dielectric materials. The surface modification process may also be used to create a planar outer exposed surface on a wafer having an exposed area of a conductive material, a dielectric material, or a combination.

One recent method of modifying or refining exposed surfaces of structured wafers treats a wafer surface with a fixed abrasive article. In use, the fixed abrasive article may be contacted with a semiconductor wafer surface, often in the presence of a working liquid, with a motion adapted to modify a layer of material on the wafer and provide a planar, uniform wafer surface. The working liquid may be applied to the surface of the wafer to chemically modify or otherwise facilitate the removal of material from the surface of the wafer under the action of the abrasive article.

SUMMARY

Defects formed in a substrate during chemical mechanical planarization (CMP) are a major concern in the electronics industry. Reducing the particle size of the abrasive particles used in CMP is one method that could be effective in reducing defects. However, because the substrate removal rate is proportional to the abrasive particle size, a decrease in abrasive particle size would usually be expected to result in a decreased removal rate of the substrate material. The present inventors have surprisingly discovered that a small fraction of larger sub-micrometer ceria abrasive particles, blended with smaller surface treated nano-ceria filler particles in a binder matrix material to form a structured fixed abrasive article, may be useful in CMP to maintain the desirable high removal rates obtained with larger abrasive particles, while achieving the reduced defects associated with use of nano-sized abrasive particulates.

In some exemplary embodiments, blending of 100-500 nanometer (nm) ceria abrasive particles with surface treated ceria filler particles having a volume mean diameter less than 100 nm provided the synergistic effects of high removal rates and reduced defects in silicon wafer CMP. In contrast, fixed abrasive articles comprising nano-sized ceria particulates alone achieved material removal rates too low to be practically useful.

Thus, in one aspect, the present disclosure relates to a structured fixed abrasive article comprising a plurality of three-dimensional abrasive composites fixed to the abrasive article, wherein the abrasive composites comprise a plurality of ceria abrasive particles having a volume mean diameter from 100 to 500 nm in a matrix material, the matrix material comprising a polymeric binder and a plurality of surface treated ceria filler particles having a volume mean diameter less than 100 nm. In further exemplary embodiments, the shaped abrasive composites comprise precisely shaped abrasive composites. In certain exemplary embodiments, the precisely shaped abrasive composites may consist essentially of posts lengthwise oriented substantially perpendicular to a major surface of the structured fixed abrasive article. In certain exemplary embodiments, the structured fixed abrasive article further comprises one or more of a backing, an adhesive, and a subpad.

In some exemplary embodiments, the ceria abrasive particles have a volume mean diameter from 100 to 200 nm. In other exemplary embodiments, the surface treated ceria filler particles have a volume mean diameter no greater than 25 nm. In additional exemplary embodiments, the ceria abrasive particles are present in an amount of at most 50 percent by weight, based on a total weight of the abrasive composites. In additional exemplary embodiments, the surface treated ceria filler particles are present in an amount of at least 10 percent by weight, based on a total weight of the abrasive composites.

In certain exemplary embodiments, the polymeric binder comprises the reaction product of one or more (meth)acrylic monomers. In some exemplary embodiments, the surface treated ceria filler particles have a surface treatment selected from silanes, titanates, zirconates, organophosphates, organosulfonates, polyether acids, reaction products of components comprising a carboxylic (meth)acrylate and a poly(meth)acrylate, and combinations thereof. In additional exemplary embodiments, one or both of the surface treatment and the polymeric binder comprises a reaction product of beta-carboxyethyl acrylate. Optionally, one or both of the surface treatment and the polymeric binder may further comprises a reaction product of a mono(meth)acrylate.

In another aspect, the present disclosure relates to a method of making a structured fixed abrasive article comprising:

dispersing the plurality of surface treated ceria filler particles having a volume mean diameter less than 100 nanometers (nm) in a precursor to the polymeric binder;

dispersing the plurality of ceria abrasive particles having a volume mean diameter from 100 to 500 nm in the precursor to the polymeric binder;

forming the plurality of three-dimensional abrasive composites from a mixture of the surface treated ceria filler particles and the ceria abrasive particles in the precursor to the polymeric binder; and curing the plurality of three-dimensional abrasive composites, thereby forming the polymeric binder comprising the matrix material of the structured fixed abrasive article.

In some presently preferred embodiments, forming the plurality of three-dimensional abrasive composites further comprises forming a layer of the mixture on a backing, and contacting the layer with a production tool having a plurality of precisely-shaped cavities, thereby forming the plurality of three-dimensional abrasive composites.

In some exemplary embodiments, the surface treated ceria filler particles have a surface treatment selected from silanes, titanates, zirconates, organophosphates, organosulfonates, polyether acids, reaction products of components comprising a carboxylic (meth)acrylate and a poly(meth)acrylate, and combinations thereof. In certain exemplary embodiments, one or both of the surface treatment and the polymeric binder comprises a reaction product of beta-carboxyethyl acrylate, optionally wherein one or both of the surface treatment and the polymeric binder further comprises a reaction product of a mono(meth)acrylate.

In certain exemplary embodiments, the precursor to the polymeric binder further comprises a free-radical photoinitiator, and curing the plurality of three-dimensional abrasive composites comprises radiation curing of the precursor to the polymeric binder. In some additional exemplary embodiments, the precursor to the polymeric binder further comprises a free-radical thermal initiator, and curing the plurality of three-dimensional abrasive composites comprises thermally post-curing the matrix material. In further exemplary embodiments, dispersing the plurality of surface treated ceria filler particles in the precursor to the polymeric binder occurs before dispersing the plurality of ceria abrasive particles in the precursor to the polymeric binder.

In addition, the present inventors have discovered that applying a conditioning technique to the surface of a structured fixed abrasive article as described above before or during polishing of a substrate may, in some exemplary embodiments, provide an effective method to improve removal rate and within wafer non-uniformity (WIWNU).

Thus, in an additional aspect, the present disclosure relates to a method of using a structured fixed abrasive article comprising:

providing a structured fixed abrasive article comprising a plurality of three-dimensional abrasive composites fixed to the abrasive article, wherein the abrasive composites comprise a plurality of ceria abrasive particles having a volume mean diameter from 100 to 500 nanometers (nm) in a matrix material, the matrix material comprising a polymeric binder and a plurality of surface treated ceria filler particles having a volume mean diameter less than 100 nm;

conditioning the plurality of three-dimensional abrasive composites by at least partially abrading the matrix material to expose at least a portion of the ceria abrasive particles, thereby producing a conditioned surface of the structured fixed abrasive article;

contacting a workpiece with the conditioned surface of the structured fixed abrasive article; and relatively moving the workpiece and the structured fixed abrasive article, optionally in the presence of a liquid medium In certain exemplary embodiments, at least partially abrading the matrix material to expose at least a portion of the ceria abrasive particles further comprises contacting the plurality of three-dimensional abrasive composites with a surface of a pad conditioner comprising at least one of diamond particulates or chemical vapor deposited diamond, and relatively moving the structured fixed abrasive article and the pad conditioner. In some exemplary embodiments, the workpiece comprises a silicon wafer.

It may be an advantage of one or more embodiments of the present disclosure to make improved fixed abrasive articles for use in CMP processes. In some exemplary embodiments, the fixed abrasive articles may be useful in abrading a dielectric material. In other exemplary embodiments, the fixed abrasive articles may be useful in polishing metal layers, for example copper, aluminum or tungsten layers, deposited on a wafer. In certain exemplary embodiments, such fixed abrasive articles may be long lasting, e.g., the abrasive article may be able to process at least 5-20, and even 30 or more wafers. The abrasive articles, in some embodiments, may also provide a good dielectric material removal rate. Additionally, the abrasive articles may be capable, of yielding, in certain embodiments, a semiconductor wafer having an acceptable flatness, surface finish and minimal dishing.

Various aspects and advantages of exemplary embodiments of the present invention have been summarized. The above Summary is not intended to describe each illustrated embodiment or every implementation of the present invention. The Drawings and the Detailed Description that follow more particularly exemplify certain preferred embodiments using the principles disclosed herein.

DETAILED DESCRIPTION

Glossary

Figure 1:
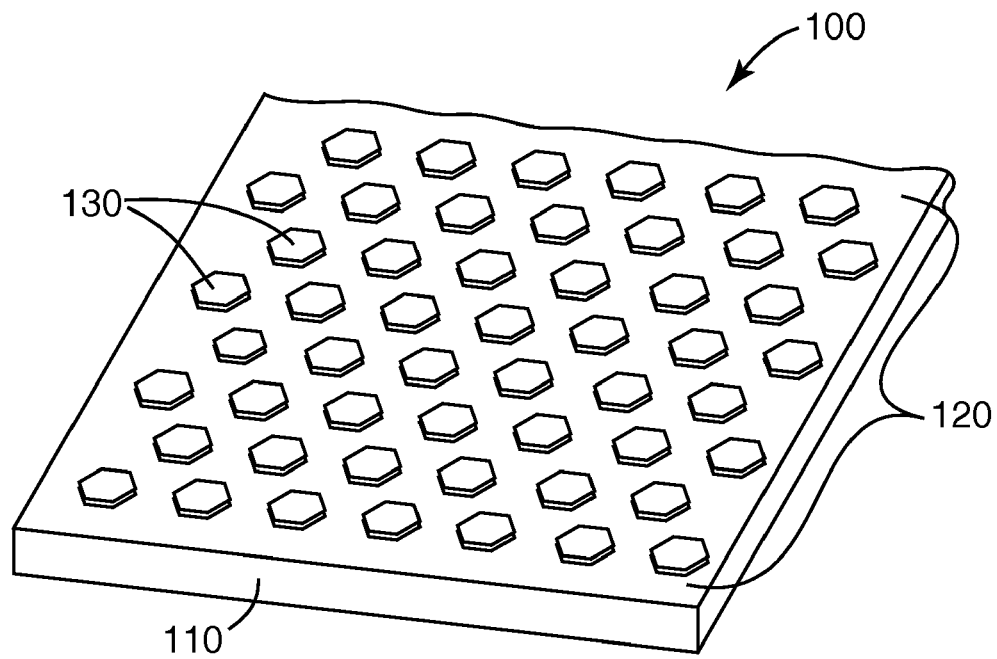
FIG. 1 is a perspective view of a structured fixed abrasive article according to one exemplary embodiment of the present disclosure.

Throughout this disclosure, the following definitions apply:

A "fixed abrasive article" is an integral abrasive article that is substantially free of unattached abrasive particles except as may be released during the abrading process.

A "three-dimensional abrasive article" is an abrasive article having numerous abrasive particles extending throughout at least a portion of its thickness such that removing some of the particles during the abrading process exposes additional abrasive particles capable of performing the abrading function.

A "textured abrasive article" is an abrasive article having raised portions and recessed portions in which at least the raised portions contain abrasive particles and polymeric binder.

An "erodible abrasive article" is an abrasive article that breaks down under use conditions in a controlled manner.

An "abrasive composite" refers to one of a plurality of shaped bodies which collectively provide a textured, three-dimensional abrasive article comprising abrasive particles and a polymeric binder.

A "precisely shaped abrasive composite" refers to an abrasive composite having a molded shape that is substantially the inverse of the mold cavity which may be retained after the composite has been removed from the mold. In certain embodiments, the composite may be substantially free of abrasive particles protruding beyond the exposed surface of the shape before the abrasive article has been used, for example, as described in U.S. Pat. No. 5,152,917 (Pieper et al.), the entire disclosure of which is incorporated herein by reference.

A "structured fixed abrasive article" refers to a textured fixed abrasive three dimensional abrasive article including a plurality of abrasive composites, which may be precisely shaped abrasive composites.

The terms "cerium oxide" and "ceria" interchangeably refer to $Ce(IV)O_2$;

The terms "ceria abrasive particle" refers to any particle comprising cerium oxide and having a hardness equal or greater to that of ceria.

The term "surface treated ceria filler particle" refers to any particle comprising cerium oxide and having a surface that comprises a surface treatment, for example, a chemical or physical surface treatment.

The terms "surface treated nano-ceria fillers," "surface treated nano-ceria particles," and "surface treated nano-ceria particulates" refer, interchangeably, to a plurality of surface treated ceria filler particles having a volume mean diameter less than 100 nanometers.

A "matrix material" refers to the material in which the ceria abrasive particles are dispersed. As used herein, the matrix material comprises the polymeric binder and the plurality of surface treated nano-ceria inorganic filler particles dispersed within the polymeric binder.

A "sol" refers to a collection of non-aggregated colloidal particles dispersed in a liquid medium.

A "colloidal metal oxide particle" refers to a metal oxide particle, preferably spherical in shape, having a volume mean diameter no greater than 1,000 nanometers.

A "ceramer" refers to a composition comprising substantially non-aggregated colloidal metal oxide particles dispersed in a polymeric binder precursor.

The term "carboxylic (meth)acrylate" means a compound having a (meth)acrylate group covalently linked to a carboxyl ($—CO_2H$) or carboxylate ($—CO_2—$) group.

The term "(meth)acryl" includes acryl and/or methacryl.

The term "poly(meth)acrylate" means a compound having at least two (meth)acrylate groups.

The term "visible light" refers to light having a wavelength in a range of from 400 nanometers to 700 nanometers, inclusive.

The term "transparent" means capable of optically transmitting visible light so that objects or images can be seen substantially as if there were no intervening material The term "translucent" means at least partially transparent.

The term "at least translucent" means translucent or transparent.

The term "optical transmission" means the fraction of incident light transmitted through an object.

For purposes of this disclosure, unless otherwise noted, all particle size references are intended to refer to a volume mean particle diameter, determined using laser light scattering, for example.

In general, the present disclosure relates to fixed abrasive articles for polishing a workpiece such as a wafer in a chemical mechanical planarization (CMP) process. The present inventors discovered a need for improved fixed abrasive articles exhibiting longer life and other performance enhancements when used in a CMP process. For the purpose of describing the present invention, the non-limiting example of abrasive articles suitable for processing workpieces in the form of semiconductor wafers useful in the fabrication of electronic devices will be described. It will be appreciated by one skilled in the art that other workpieces may be employed. For example, MEMS devices, substrates for use in hard disk drives, and the like may be abraded by articles of the present invention. In some embodiments, the abrasive articles and methods of the present invention are particularly well suited for microfinishing applications.

Fixed abrasive articles for use in finishing operations during the manufacture of semiconductor devices have been described in the art. They offer benefits with respect to the results obtained, such as planarity, and with respect to the disposal of process materials such as spent abrasive slurry. In addition, they generally are used in processes that result in less debris remaining on the wafer surface. Such debris can require extensive cleaning operations and may lead to lower device yields, especially as feature sizes are reduced.

With respect to the above discussion of fixed abrasive articles for CMP, applicant has discovered that the abrasive performance of fixed abrasive articles described in the art can be substantially maintained while enhancing the overall article life by replacing a portion of the abrasive particles with an equivalent volume of nanoparticulate inorganic filler particles. This replacement is contrary to the teachings of the art, which teaches optimization of the ratio of abrasive particles to polymeric binder in order having the desired abrasion rate, and then optionally introduces plasticizers, micro-particulate fillers (i.e., fillers having a volume mean particle diameter greater than one micrometer or 1,000 nanometers) and other agents to modify the erodibility of the abrasive composites.

The art teaches that a significant degree of erodibility of the abrasive article is necessary to replace worn abrasive particles at the surface of the abrasive article in order to prevent a reduction in the wafer dielectric material removal rate as the exposed abrasive particles dulled. It was further taught that increasing the degree of erodibility produces a corresponding decrease in the useful life of the abrasive article. Thus, efforts to increase the durability of a fixed abrasive article resulted in a corresponding reduction in the material removal rate as the abrasive particles are dulled. Alternatively, efforts to increase the material removal rates of a fixed abrasive article inevitably resulted in an undesirable reduction of the article's useful life.

While not wishing to be bound by any particular theory, applicant has found that replacing abrasive particles with nanoparticulate inorganic filler particles dispersed within a matrix material forming the abrasive composites of the fixed abrasive article acts to substantially maintain the material removal rate of the abrasive composite, while increasing the durability and life of the fixed abrasive article. Thus replacement of a portion of the abrasive particles by nanoparticulate inorganic fillers may result, in certain embodiments, in unexpected increases in the overall life of the abrasive article while maintaining a higher than expected material removal rate similar to and in some cases greater than for an abrasive article containing the abrasive particles alone, at a comparable volume fraction.

Defects formed in a substrate during chemical mechanical planarization (CMP) are a major concern in the electronics industry. Reducing the particle size of the abrasive particles used in CMP is one method that could be effective in reducing defects. However, because the substrate removal rate is proportional to the abrasive particle size, a decrease in abrasive particle size would usually be expected to result in a decreased removal rate of the substrate material. The present inventors have surprisingly discovered that a small fraction of larger sub-micrometer ceria abrasive particles, blended with smaller surface treated nano-ceria filler particles in a binder matrix material to form a structured fixed abrasive article, may be useful in CMP to maintain the desirable high removal rates obtained with larger abrasive particles, while achieving the reduced defects associated with use of nano-sized abrasive particulates.

In some exemplary embodiments, blending of 100-500 nm ceria abrasive particles with surface treated ceria filler particles having a volume mean diameter less than 100 nanometers provides the synergistic effects of high removal rates and reduced defects in silicon wafer CMP. In contrast, structured fixed abrasive articles comprising nano-sized ceria particulates alone achieved material removal rates too low to be practically useful. While not wishing to be bound by any particular theory, we believe that the higher removal rates were achieved by use of the larger sub-micrometer abrasive particles, while the defects were reduced by use of the smaller nano-sized filler particles.

In addition, the present inventors have discovered that applying a conditioning technique to the surface of a structured fixed abrasive article as described above before or during polishing of a substrate may, in some exemplary embodiments, provide an effective method to improve removal rate and within wafer non-uniformity (WIWNU). While not wishing to be bound by any particular theory, we believe that this may be beneficial because the nano-particles are so small that they are embedded in the binder materials, and conditioning before or during use acts to remove at least a portion of the binder or other matrix material, thereby exposing more of the abrasive particles and/or the abrasive particle surfaces at the surface of the fixed abrasive article.

Various exemplary embodiments of the disclosure will now be described with particular reference to the Drawings. Exemplary embodiments of the invention may take on various modifications and alterations without departing from the spirit and scope of the disclosure. Accordingly, it is to be understood that the embodiments of the invention are not to be limited to the following described exemplary embodiments, but is to be controlled by the limitations set forth in the claims and any equivalents thereof.

Fixed Abrasive Articles

In some exemplary embodiments according to the present disclosure, fixed abrasive articles comprising a plurality of three-dimensional abrasive composites are made. In one exemplary method of making a fixed abrasive article, a plurality of three-dimensional abrasive composites is formed. The abrasive composites include a plurality of abrasive particles having a volume mean diameter less than 500 nanometers dispersed in a matrix material. The matrix material further includes a polymeric binder and a plurality of dispersed inorganic filler particles having a volume mean diameter no greater than about 200 nanometers.

In one aspect, the present disclosure relates to a structured fixed abrasive article comprising a plurality of three-dimensional abrasive composites fixed to the abrasive article, wherein the abrasive composites comprise a plurality of ceria abrasive particles having a volume mean diameter from 100 to 500 nanometers (nm) in a matrix material, the matrix material comprising a polymeric binder and a plurality of surface treated ceria filler particles having a volume mean diameter less than 100 nanometers.

Figure 3:
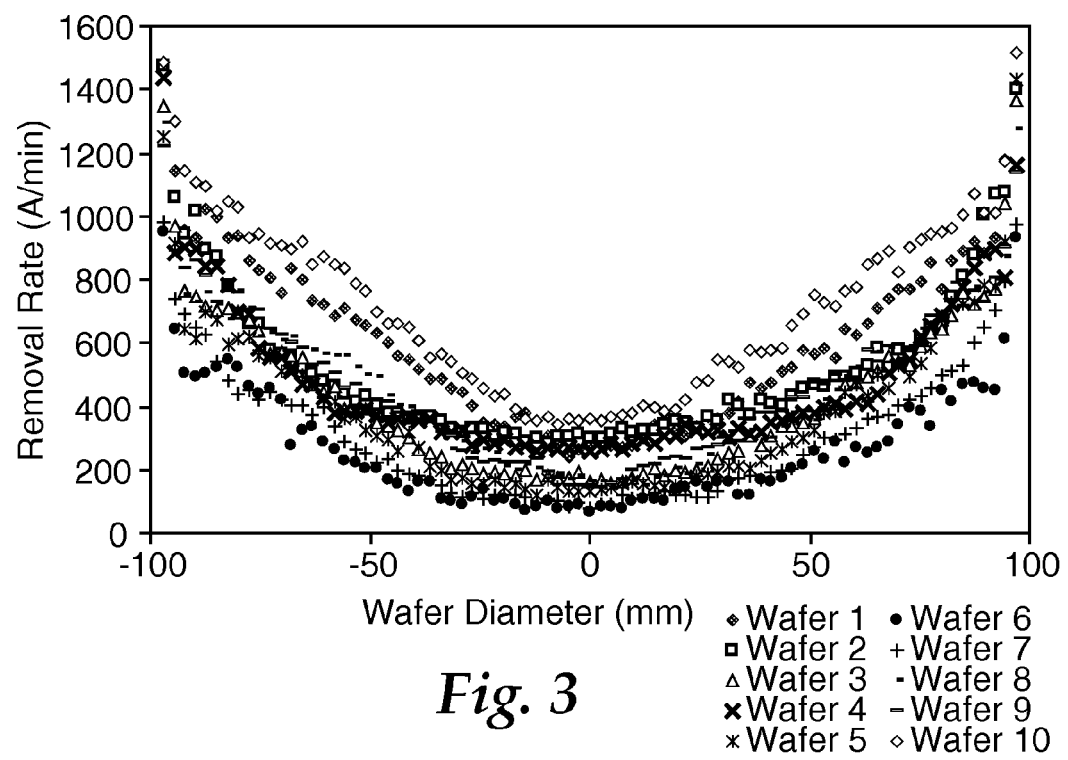
FIG. 3 is a graph showing silicon wafer polishing performance using an exemplary structured fixed abrasive article according to one exemplary embodiment of the present disclosure.

In some exemplary embodiments, the shaped abrasive composites comprise precisely shaped abrasive composites. In certain exemplary embodiments, the precisely shaped abrasive composites may consist essentially of posts lengthwise oriented substantially perpendicular to a major surface of the structured fixed abrasive article. In some embodiments of structured fixed abrasive articles described herein, the abrasive composites are "three-dimensional" such that there are numerous abrasive particles throughout at least a portion of the thickness of the abrasive article. The abrasive article may also have a "texture" associated with it, i.e., it may be a "textured" abrasive article. This can be seen with reference to the abrasive articles illustrated in FIG. 3 of Culler, et al. (U.S. Pat. No. 5,942,015), the disclosures of which is incorporated herein by reference, in which the pyramid-shaped composites are the raised portions and in which the valleys between the pyramids are the recessed portions.

The recessed portions may act as channels to help distribute the working liquid over the entire wafer surface. The recessed portions may also act as channels to help remove the worn abrasive particles and other debris from the wafer and abrasive article interface to minimize undesirable scratching. The recessed portions may also minimize the phenomenon known in the art as "stiction". If the abrasive surface is too smooth rather than textured, an abrasive article may tend to stick to or become lodged against the wafer surface. Finally, the recessed portions may allow a higher unit pressure and shear on the raised portions of the abrasive article and, thus help to expel dulled abrasive particles from the abrasive surface and expose new abrasive particles.

In certain exemplary embodiments, the structured fixed abrasive article further comprises one or more of a backing, an adhesive, and a subpad. In certain exemplary embodiments, the structured fixed abrasive article may be a three-dimensional fixed abrasive article comprising a backing (as described further below) having a first major surface and a second major surface, and a plurality of abrasive composites distributed on the first major surface of the backing. In some embodiments, the backing may be substantially opaque. In other exemplary embodiments, the backing may be transparent or translucent.

An adhesive, for example a pressure sensitive adhesive, may be applied to the opposing surface of the backing (not shown). The back surface of the backing may be attached to the subpad with the adhesive in order to fix the structured abrasive article to the subpad. Suitable subpads are described, for example, in U.S. Pat. Nos. 5,692,950 and 6,007,407, the entire disclosure of each reference is incorporated herein by reference.

Additionally, in certain embodiments, the structured abrasive articles may be in the form of an abrasive layer secured to a subpad. The abrasive layer may be formed by coating, extrusion, or other methods known to those skilled in the art. The subpad may have a front surface and a back surface and the abrasive layer may be present over the front surface and/or the back surface of the subpad. The abrasive layer may be applied to a front surface of a backing, as shown in FIG. 1.

Thus, with particular reference to FIG. 1, in some embodiments, structured fixed abrasive article 100 may comprise a film backing 110, an abrasive layer 120 disposed on at least backing 110 and comprising a plurality of shaped abrasive composites 130. Shaped abrasive composites 130 comprise a plurality of ceria abrasive particles having a volume mean diameter from 100 to 500 nm in a matrix material, the matrix material comprising a polymeric binder and a plurality of surface treated ceria filler particles having a volume mean diameter less than 100 nm.

In some embodiments, the structured abrasive articles of the present disclosure may be generally circular in shape, e.g., in the form of an abrasive disc. The outer edges of the circular abrasive disc are preferably smooth, or may be scalloped. The structured abrasive articles may also be in the form of an oval or of any polygonal shape such as triangular, square, rectangular, and the like. Alternatively, the abrasive articles may be in the form of a belt in another embodiment. The abrasive articles may be provided in the form of a roll, typically referred to in the abrasive art as abrasive tape rolls. In general, the abrasive tape rolls may be indexed or moved continuously during the CMP process. The abrasive article may be perforated to provide openings through the abrasive coating and/or the backing to permit the passage of the liquid medium before, during and/or after use.

In certain exemplary embodiments, the abrasive article may be long lasting, e.g., the abrasive article may be able to process at least two, preferably at least 5, more preferably at least 20, and most preferably at least 30 wafers. In some exemplary embodiments, the fixed abrasive articles may be useful in abrading and/or polishing metal layers, for example copper, aluminum or tungsten layers, deposited on a wafer. The abrasive article may, in some embodiments, provide a good dielectric material removal rate. Additionally, the abrasive article may be capable, in certain embodiments, of yielding a semiconductor wafer having an acceptable flatness, surface finish and minimal dishing. In some embodiments, the wafer's material composition, structure and feature sizes may influence the selection of the composition and structure of the abrasive article. The materials, desired texture, and/or process used to make the abrasive article may influence whether or not these criteria are met.

Ceria Abrasive Particles

As described above, the abrasive composites according to the present disclosure comprise 100-500 nm diameter (e.g. sub-micrometer) ceria abrasive particles dispersed in a matrix material comprising a polymeric binder and surface treated ceria filler particles having a volume mean diameter less than 100 nanometers.

The amount of ceria abrasive particles comprising the abrasive composites may vary. In some exemplary embodiments, the ceria abrasive particles are present in an amount of at most 50 percent by weight, at most 40 percent by weight, at most 30 percent by weight, at most 20 percent by weight, or at most 10 percent by weight, based on a total weight of the abrasive composites. In certain exemplary embodiments, the ceria abrasive particles are present in an amount of at least 5 percent by weight, at least 10 percent by weight, at least 20 percent by weight, at least 30 percent by weight, or at least 40 percent by weight, based on a total weight of the abrasive composites.

The abrasive particles comprise ceria (i.e., cerium oxide). For purposes of this disclosure, the ceria abrasive particles may also comprise other material which does not abrade the wafer surface to any significant extent, relative to abrasion produced by the ceria abrasive particles. Thus, whether a particulate material that comprises ceria and another material will act as a ceria abrasive particle depends somewhat upon the chemical composition of the material, the composition and size of the abrasive particles comprising the abrasive article, the composition of the substrate being abraded, e.g. the composition of the wafer, and the composition of the optional working liquid. For example, it is possible for a material to act as an inorganic filler particle in the context of one wafer surface and as an abrasive particle in the context of a different wafer surface.

The size of the abrasive particles may be selected, in part, based upon the particular composition of the workpiece, e.g. the wafer compositon and structure, and selection of the optional working liquid used during the abrading process. In exemplary embodiments, the ceria abrasive particles have a volume mean diameter from 100 to 200 nm. In almost all cases there will be a range or distribution of abrasive particle sizes. Thus, in certain exemplary embodiments, the ceria abrasive particles are selected to exhibit a volume mean particle diameter of at least 0.1 micrometer (100 nm) and no greater than 0.5 micrometer (500 nm). In some instances, the volume mean particle diameter of the ceria abrasive particles may be selected to be 0.45 micrometer (450 nm), 0.35 micrometer (350 nm), 0.25 micrometer (250 nm), or even as low as 0.1 micrometer (100 nm).

In some instances it may be preferred that the particle size distribution be tightly controlled such that the resulting abrasive article provides a very consistent surface finish on the wafer. It will be recognized that that the ceria particles may comprise agglomerates and/or aggregates of smaller primary ceria particles. For example, the ceria particles (whether present as primary particle, agglomerates, aggregates, or a combination thereof) may have an average particle size, on a volume basis, in a range of from 100, 200, 300, or 400 nm, up to 500 nm, or less.

The ceria abrasive particles can be supplied, for example, in the form of a powder, dispersion, or sol; however, the ceria abrasive particles are typically provided as a powder. The abrasive particles may be homogeneously or heterogeneously dispersed in the polymeric binder. The term "dispersed" refers to the abrasive particles and/or nanoparticlulate filler particles being distributed throughout the polymeric binder. It may be generally preferred that the abrasive particles and/or nanoparticulate (i.e. nano-ceria) filler particles be homogeneously dispersed so that the resulting abrasive coating provides a more consistent abrading process.

In some embodiments, the abrasive particles may be provided as abrasive agglomerates. Examples of abrasive agglomerates may be found in U.S. Pat. Nos. 6,551,366 and 6,645,624, the entire disclosures of each being incorporated herein by reference.

Surface Treated Nano-ceria Filler Particles

The fixed abrasive articles further comprise surface treated nano-ceria filler particles. The nano-ceria filler particles comprise ceria (i.e., cerium oxide). For purposes of this disclosure, the surface treated nano-ceria filler particles may also comprise other particulate material which does not abrade the wafer surface to any significant extent, relative to abrasion produced by the ceria abrasive particles. Thus, whether a particulate material is a surface treated nano-ceria filler particle will depend upon the chemical composition of the material, the composition and size of the abrasive particles comprising the abrasive article, the composition of the substrate being abraded, e.g. the composition of the wafer, and the composition of the optional working liquid. It is possible for a material to act as an inorganic filler particle in the context of one wafer surface and as an abrasive particle in the context of a different wafer surface.

The surface treated nano-ceria filler particles may alter the erodibility of the abrasive article. In some instances with the appropriate surface treated nano-ceria filler particles and amount, the surface treated nano-ceria filler particles may decrease the erodibility of the abrasive article. In other embodiments, the surface treated nano-ceria filler particles may decrease the defects resulting from using the structured fixed abrasive article to polish a particular substrate. Surface treated nano-ceria filler particles may also be selected to reduce the cost of the abrasive article, alter the rheology of the polymeric binder or polymeric binder precursor, and/or to alter the abrading characteristics of the abrasive article.

The amount of surface treated nano-ceria filler particles comprising the abrasive composites may vary. In exemplary embodiments, the surface treated ceria filler particles are present in an amount of at least 10 percent by weight, based on a total weight of the abrasive composites. In some exemplary embodiments, the surface treated nano-ceria filler particles are present in an amount of at most 80 percent by weight, at most 70 percent by weight, at most 60 percent by weight, at most 50 percent by weight, at most 40 percent by weight, at most 30 percent by weight, at most 20 percent by weight, or at most 10 percent by weight, based on a total weight of the abrasive composites. In certain exemplary embodiments, the surface treated nano-ceria filler particles are present in an amount of at least 1 percent by weight, at least 5 percent by weight, at least 10 percent by weight, at least 20 percent by weight, at least 30 percent by weight, at least 40 percent by weight, at least 50% by weight, or at least 60% by weight, based on a total weight of the abrasive composites.

In exemplary embodiments, the surface treated ceria filler particles have a volume mean diameter no greater than 100 nm. In some exemplary embodiments, the preferred volume mean diameter of the surface treated nano-ceria filler particles may be selected to be no greater than about 100 nm, more preferably no greater than about 80 nm, even more preferably no greater than about 70 nm, still more preferably no greater than about 60 nm. In certain presently preferred embodiments, the filler particles exhibit a volume mean diameter of at least about 5 nm, more preferably at least about 10 nm, even more preferably at least about 25 nm. Surface treated nano-ceria filler in the form of colloidal dispersions of particles are presently preferred.

Colloidal cerium oxide nanoparticulate filler particles particularly suitable for use in the invention are non-aggregated metal oxide particles dispersed as sols and having an average particle diameter of from about 5 to no greater than 100 nm, preferably from about 10 to about 75 nm, more preferably from about 25 to about 60 nm, and still more preferably from about 35 to about 55 nm. These size ranges are preferred on the basis of both ease of dispersing the metal oxide particles in the polymeric binder and on the improvement in the life of the abrasive articles and the reduction in defects when the abrasive articles are used in polishing a substrate.

Methods and sources for obtaining ceria sols having an average particle size less than 100 nanometers are well known in the art. Ceria dispersions and sols suitable for use in the present disclosure include, for example, ceria sols and dispersions commercially available for suppliers such as Evonik Degussa Corp. (Parsippany, N.J.); Rhodia, Inc. (Cranberry, N.J.); Ferro Corporation (Cleveland, Ohio) and Umicore SA (Brussels, Belgium).

Dispersing of the surface treated nano-ceria fillers in the polymeric binder may be important to increasing the useful life of the abrasive articles of the present invention. A preferred method of incorporating the nano-ceria fillers in the polymeric binder is to combine the polymeric binder with a sol. More preferred is to combine a polymeric binder precursor with a sol. After removal of a substantial portion of the liquid medium of the sol from the polymeric binder precursor-sol mixture, it is preferred that a ceramer is formed, i.e., that the colloidal metal oxide particles comprising the nano-ceria fillers are substantially non-aggregated. The ceramer may be preferably substantially free of the liquid medium of the sol. More preferably, the ceramer contains less than 5% by weight of the liquid medium of the sol, most preferably less than 1% by weight of the liquid medium of the sol.

Representative examples of liquid media suitable as dispersants for the colloidal metal oxide particles include water, aqueous alcohol solutions, lower aliphatic alcohols, toluene, ethylene glycol, dimethyl acetamide, formamide, and combinations thereof. The preferred liquid medium is water. When the colloidal cerium oxide particles are dispersed in water, the particles are stabilized on account of common electrical charges on the surface of each particle, which tends to promote dispersion rather than agglomeration. The like charged particles repel one another, thereby preventing aggregation. Sols useful for preparing nano-ceria ceramers can be prepared by methods well known in the art.

In some exemplary embodiments, the abrasive particles may be homogeneously or heterogeneously dispersed in a polymeric binder or polymeric binder precursor, as described further below. The term "dispersed" refers to the abrasive particles being distributed throughout the polymeric binder. Dispersing the ceria particles substantially homogeneously in the binder typically increases performance of the structured fixed abrasive article.

The dispersability of the nanoparticulate inorganic fillers in a particular polymeric binder or polymeric binder precursor may depend upon the selection of the surface treatment agent for the surface treated nano-ceria filler particles. Often, it may be preferred to have a mixture of two or more surface treatment agents producing the desirable degree of dispersion. A dispersion of nanoparticulate inorganic fillers that are substantially non-aggregated in a polymeric binder or polymeric binder precursor may be preferred.

Thus, in exemplary embodiments, the nano-ceria fillers are provided with a surface treatment comprising one or more surface treatment agents. In some exemplary embodiments, the surface treated ceria filler particles have a surface treatment selected from silanes, titanates, zirconates, organophosphates, organosulfonates, polyether acids, reaction products of components comprising a carboxylic (meth)acrylate and a poly(meth)acrylate, and combinations thereof.

Examples of silane surface treatment agents suitable for this invention include octyltriethoxysilane, vinyltrimethoxysilane, vinyl triethoxysilane, methyltrimethoxysilane, methyltriethoxysilane, propyltrimethoxysilane, propyltriethoxysilane, tris-[3-(trimethoxysilyl)propyl] isocyanurate, vinyltris-(2-methoxyethoxy)silane, gamm-methacryloxypropyltrimethoxysilane, beta-(3,4-epoxycyclohexyl)ethyltrimethoxysilane, gamma-glycidoxypropyltrimethoxysilane, gamma-mercaptopropyltrimethoxysilane, gamma-aminopropyltriethoxysilane, gamma-aminopropyltrimethoxysilane, N-beta-(aminoethyl)-gamma-aminopropyltrimethoxysilane, bis-(gamma-trimethoxysilylpropyl)amine, N-phenyl-gamma-aminopropyltrimethoxysilane, gamma-ureidopropyltrialkoxysilane, gamma-ureidopropyltrimethoxysilane, acryloxyalkyl trimethoxysilane, methacryloxyalkyl trimethoxysilane, phenyl trichlorosilane, phenyltrimethoxysilane, phenyl triethoxysilane, A1230 proprietary non-ionic silane dispersing agent (available from OSI Specialties, Inc., Danbury, Conn.) and mixtures thereof. Examples of commercially available surface treatment agents include "A174" and "A1230" (available from OSI Specialties, Inc., Danbury, Conn.).

In further embodiments, the nano-ceria filler particles may have a surface treatment formed by a surface treatment agent that provides an association bridge between one or more of the polymeric binder and/or polymeric binder precursor, and the surface of the nano-ceria filler particles. When desirable, the chemical composition of the polymeric binder or polymeric binder precursor and the surface of the nano-ceria filler particles may be selected in conjunction with the chemical composition of the surface treatment agent(s) to facilitate this bridge. In some embodiments, bridging may be achieved through inherent attractive forces (for example, Van der Waals forces) between the polymeric binder or polymeric binder precursor and the surface treatment agent; and inherent attractive forces between the surface treatment agent and the surface of the nano-ceria filler particles. In further embodiments, bridging may be achieved by chemical reaction between functional groups comprising one or more of the polymeric binder, the polymeric binder precursor, the surface treatment agent, and the surface of the nano-ceria filler particles, acid-base interactions and ionic interactions being included.

Accordingly, it is typically useful to treat the ceria particles with a carboxylic (meth)acrylates to facilitate their dispersibility and/or reduce aggregation, and enhance subsequent coupling to the polymeric binder, particularly when the binder comprises a basic polymer, such as a hydroxyl-functional polymer, or a (meth)acrylic polymer. Exemplary carboxylic (meth)acrylates include (meth)acrylic acid, monoalkyl esters of maleic acid, fumaric acid, monoalkyl esters of fumaric acid, maleic acid, itaconic acid, isocrotonic acid, crotonic acid, citraconic acid, and beta-carboxyethyl (meth)acrylate.

In one exemplary method for treating the ceria particles with a carboxylic (meth)acrylate, a dispersion (e.g., a sol) of the ceria particles in an aqueous medium (e.g., water) is combined with a polyether acid and carboxylic (meth)acrylate (in amounts of each that are sufficient to surface treat and thereby stabilize the ceria particles) and a water-miscible organic solvent having a higher boiling point than water. Typically, the proportion of polyether acid to carboxylic (meth)acrylate is in a range of from about 3:5 to 5:3, although other proportions may be used. Examples of useful solvents include 1-methoxy-2-propanol, dimethylformamide, and diglyme. Once combined, the water is substantially removed by evaporation under reduced pressure resulting in a ceria dispersion in which the ceria particles are stabilized against aggregation by associated carboxylic (meth)acrylate molecules. This resultant ceria dispersion can typically be readily combined with the poly(meth)acrylate and optional mono (meth)acrylate monomers, and any additional carboxylic (meth)acrylate that may be included in the binder precursor.

While the carboxylic (meth)acrylate typically serves to facilitate bonding of the ceria particles to the binder, the polyether acid is included primarily to facilitate dispersion stability of the ceria particles in the binder (or its precursor components) and/or solvent. As used herein, the term refers to a compound having a polyether segment covalently to an acidic group or salt thereof. Exemplary polyether segments include polyethylene glycol segments, polyethylene glycol segments, and mixed poly(ethylene glycol/propylene glycol) segments. Exemplary acidic groups include —$CO_2H$, —$PO_2H$, —$PO_3H$, —$SO_3H$, and salts thereof. In certain embodiments, the polyether acids have up to 12 carbon atoms, inclusive, and are represented by the formula:

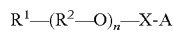

wherein: $R^1$ represents H, an alkyl group having from 1 to 6 carbon atoms (e.g., methyl ethyl, or propyl), or an alkoxy group having from 1 to 6 carbon atoms (e.g., methoxy, ethoxyl, or propoxy); each $R^2$ independently represents a divalent alkylene group having from 1 to 6 carbon atoms (e.g., ethylene, propylene, or butylene); n represents a positive integer (e.g., 1, 2, or 3; and X represents a divalent organic linking group or a covalent bond; and A represents an acidic group (e.g., as described hereinabove). Exemplary such polyether acids include 2'-(2"-methoxyethoxy)ethyl succinate (monoester), methoxyethoxyethoxyacetic acid, and methoxyethoxyacetic acid.

Matrix Material and Polymeric Binder

In exemplary structured fixed abrasive articles according to the present disclosure, the abrasive composites are formed by a matrix material that may fix the abrasive particles in the abrasive article so that the abrasive particles do not readily disassociate from the abrasive article during the abrading process. In certain embodiments, the matrix material includes a polymeric binder and a plurality of nano-ceria filler particles dispersed within the polymeric binder. The polymeric binder may, for example, comprise a polymer or polymeric binder precursor. Thus, in certain embodiments, the polymeric binder is a pre-formed polymer.

The structured fixed abrasive article may include, in certain embodiments, a plurality of abrasive particles dispersed in a polymeric binder. The particular chemical and mechanical properties of the polymeric binder, in some embodiments, may be important to the performance of the abrasive article. Thus, the polymeric binder may be selected to provide the desired characteristics of the abrasive article.

In certain embodiments, the preferred polymeric binders are free radical curable polymeric binder precursors. These polymeric binder precursors are capable of polymerizing rapidly upon exposures to thermal energy or radiation energy. One preferred subset of free radical curable polymeric binder precursors includes ethylenically unsaturated polymeric binder precursors. Examples of such ethylenically unsaturated polymeric binder precursors include aminoplast monomers or oligomers having pendant alpha, beta unsaturated carbonyl groups, ethylenically unsaturated monomers, e.g. acrylates or ethylenically unsaturated oligomers, acrylated isocyanurate monomers, acrylated urethane oligomers, acrylated epoxy monomers or oligomers, or diluents, acrylate esters, and mixtures thereof. The term acrylate includes both acrylates and methacrylates.

In addition to thermosetting polymeric binders or binder precursors (described below), thermoplastic polymeric binders may also be used. Examples of suitable thermoplastic polymeric binders include polyamides, polyethylene, polypropylene, polyesters, polyurethanes, polyetherimide, polysulfone, polystyrene, acrylonitrile-butadiene-styrene block copolymer, styrene-butadiene-styrene block copolymers, styrene-isoprene-styrene block copolymers, acetal polymers, polyvinyl chloride and combinations thereof. Water-soluble polymeric binder precursors optionally blended with a thermosetting resin may be used. Examples of water-soluble polymeric binder precursors include polyvinyl alcohol, hide glue, or water-soluble cellulose ethers such as hydroxypropylmethyl cellulose, methyl cellulose or hydroxyethylmethyl cellulose.

Alternatively, in some embodiments, the polymeric binders for the abrasive articles may be formed in situ from an organic polymeric binder precursor. The polymeric binder precursor preferably may be capable of flowing sufficiently so as to be coatable, and then solidifying. Solidification may be achieved by curing (e.g., polymerizing and/or crosslinking) and/or by drying, or simply upon cooling. The polymeric binder precursor may be an organic solvent-borne, a water-borne, or a 100% solids (i.e., a substantially solvent-free)

composition. Thermoplastic or thermosetting polymers or materials, as well as combinations thereof, may be used as the polymeric binder precursor.

The binder precursors may be in the form of monomers, oligomers, polymers, or combinations thereof. Suitable polymeric binders and polymeric binder precursors are described in U.S. Pat. No. 6,194,317 to Kaisaki et al., the entire disclosure of which is incorporated herein by reference. The polymeric binder precursor may be preferably a curable organic material (i.e., a polymer or material capable of polymerizing and/or crosslinking upon exposure to heat and/or other sources of energy, such as e-beam, ultraviolet, visible, etc., or with time upon the addition of a chemical catalyst, moisture, or other agent which cause the polymer to cure or polymerize). Binder precursor examples include epoxy polymers, amino polymers or aminoplast polymers such as alkylated urea-formaldehyde polymers, melamine-formaldehyde polymers, and alkylated benzoguanamine-formaldehyde polymer, acrylate polymers including acrylates and methacrylates such as vinyl acrylates, acrylated epoxies, acrylated urethanes, acrylated polyesters, acrylated polyethers, vinyl ethers, acrylated oils, and acrylated silicones, alkyd polymers such as urethane alkyd polymers, polyester polymers, reactive urethane polymers, phenolic polymers such as resole and novolac polymers, phenolic/latex polymers, epoxy polymers such as bisphenol epoxy polymers, isocyanates, isocyanurates, polysiloxane polymers including alkylalkoxysilane polymers, or reactive vinyl polymers.

In certain presently preferred embodiments, the polymeric binder comprises the reaction product of one or more (meth)acrylic monomers. In certain presently preferred embodiments, the binder comprises a reaction product of components comprising a carboxylic (meth)acrylate and a poly(meth)acrylate. As discussed above, at least a portion of the carboxylic (meth)acrylate is typically combined with the abrasive particles prior to combining the resultant dispersion with the remaining binder components, although this is not a requirement. In additional presently preferred embodiments, one or both of the surface treatment and the polymeric binder comprises a reaction product of beta-carboxyethyl acrylate. Optionally, one or both of the surface treatment and the polymeric binder may further comprises a reaction product of a mono(meth)acrylate.

When the structured fixed abrasive article is made, the polymeric binder precursor may be exposed to conditions (typically an energy source) to help initiate cure or polymerization of the polymeric binder precursor. During this polymerization or curing step, the polymeric binder precursor may be solidified and converted into a polymeric binder. It may be preferred that the polymeric binder precursor comprises a free radical curable polymer. Upon exposure to an energy source, such as radiation energy, the free radical curable polymer may be chain-extended and/or cross-linked to form the polymeric binder.

In some embodiments, the components may also include one or more of: a free-radical photoinitiator, a free-radical thermal initiator, antioxidant, colorant, and filler (the filler having substantially no impact on abrading performance). Accordingly, the binder is typically prepared from a binder precursor comprising the components, and in which the abrasive particles are dispersed (e.g., as a slurry).

Suitable binder precursors are typically, in an uncured state, flowable at or near ambient conditions. The binder precursor is typically exposed to conditions (typically an energy source) that at least partially cure (i.e., free-radical polymerization) the binder precursor, thereby converting it into a binder capable of retaining the dispersed abrasive particles. Exemplary energy sources include: e-beam, ultraviolet radiation, visible radiation, infrared radiation, gamma radiation, heat, and combinations thereof.

Examples of some preferred free radical curable polymers include (meth)acrylate monomers, (meth)acrylate oligomers or (meth)acrylate monomer and (meth)acrylate oligomer combinations. Useful poly(meth)acrylates include monomers and/or oligomers that have at least two (meth)acrylate groups; for example, tri(meth)acrylates, and tetra(methacrylates). Exemplary poly(methacrylates) include: di(meth)acrylates such as, for example, 1,3-butylene glycol di(meth)acrylate, 1,4-butanediol di(meth)acrylate, 1,6-hexanediol di(meth)acrylate, 1,6-hexanediol mono(meth)acrylate mono(meth)acrylate, ethylene glycol di(meth)acrylate, alkoxylated aliphatic di(meth)acrylate, alkoxylated cyclohexanedimethanol di(meth)acrylate, alkoxylated hexanediol di(meth)acrylate, alkoxylated neopentyl glycol di(meth)acrylate, caprolactone modified neopentyl glycol hydroxypivalate di(meth)acrylate, caprolactone modified neopentyl glycol hydroxypivalate di(meth)acrylate, cyclohexanedimethanol di(meth)acrylate, diethylene glycol di(meth)acrylate, dipropylene glycol di(meth)acrylate, ethoxylated (10) bisphenol A di(meth)acrylate, ethoxylated (3) bisphenol A di(meth)acrylate, ethoxylated (30) bisphenol A di(meth)acrylate, ethoxylated (4) bisphenol A di(meth)acrylate, hydroxypivalaldehyde modified trimethylolpropane di(meth)acrylate, neopentyl glycol di(meth)acrylate, polyethylene glycol (200) di(meth)acrylate, polyethylene glycol (400) di(meth)acrylate, polyethylene glycol (600) di(meth)acrylate, propoxylated neopentyl glycol di(meth)acrylate, tetraethylene glycol di(meth)acrylate, tricyclodecanedimethanol di(meth)acrylate, triethylene glycol di(meth)acrylate, tripropylene glycol di(meth)acrylate; tri(meth)(meth)acrylates such as glycerol tri(meth)acrylate, trimethylolpropane tri(meth)acrylate, ethoxylated tri(meth)acrylates (e.g., ethoxylated (3) trimethylolpropane tri(meth)acrylate, ethoxylated (6) trimethylolpropane tri(meth)acrylate, ethoxylated (9) trimethylolpropane tri(meth)acrylate, ethoxylated (20) trimethylolpropane tri(meth)acrylate), pentaerythritol tri(meth)acrylate, propoxylated tri(meth)acrylates (e.g., propoxylated (3) glyceryl tri(meth)acrylate, propoxylated (5.5) glyceryl tri(meth)acrylate, propoxylated (3) trimethylolpropane tri(meth)acrylate, propoxylated (6) trimethylolpropane tri(meth)acrylate), trimethylolpropane tri(meth)acrylate, tris(2-hydroxyethyl)isocyanurate tri(meth)acrylate; and higher functionality (meth)acryl containing compounds such as ditrimethylolpropane tetra(meth)acrylate, dipentaerythritol penta(meth)acrylate, ethoxylated (4) pentaerythritol tetra(meth)acrylate, pentaerythritol tetra(meth)acrylate, caprolactone modified dipentaerythritol hexa(meth)acrylate; oligomeric (meth)acryl compounds such as, for example, polyester (meth)acrylates, epoxy (meth)acrylates; and combinations thereof. Such compounds are widely available from vendors such as, for example, Sartomer Co. of Exton, Pa.; UCB Chemicals Corporation of Smyrna, Ga.; and Aldrich Chemical Company of Milwaukee, Wis.

The binder precursor may comprise an effective amount of at least one photoinitiator; for example, in an amount of from 0.1, 1, or 3 percent by weight, up to 5, 7, or even 10 percent by weight, or more. Useful photoinitiators include those known as useful for free-radically photocuring (meth)acrylates. Exemplary photoinitiators include benzoin and its derivatives such as alpha-methylbenzoin; alpha-phenylbenzoin; alpha-allylbenzoin; alpha-benzylbenzoin; benzoin ethers such as benzil dimethyl ketal (available as IRGACURE 651 from Ciba Specialty Chemicals, Tarrytown, N.Y.), benzoin methyl ether, benzoin ethyl ether, benzoin n-butyl ether;

acetophenone and its derivatives such as 2-hydroxy-2-methyl-1-phenyl-1-propanone (available as DAROCUR 1173 from Ciba Specialty Chemicals) and 1-hydroxycyclohexyl phenyl ketone (available as IRGACURE 184 from Ciba Specialty Chemicals); 2-methyl-1-[4-(methylthio)phenyl]-2-(4-morpholinyl)-1-propanone (available as IRGACURE 907 from Ciba Specialty Chemicals); 2-benzyl-2-(dimethylamino)-1-[4-(4-morpholinyl)phenyl]-1-butanone (available as IRGACURE 369 from Ciba Specialty Chemicals); and (phenyl bis(2,4,6-trimethylbenzoyl) phosphine oxide (available as IRGACURE 819 from Ciba Specialty Chemicals, NY. Other useful photoinitiators include mono- and bis-acylphosphines (available, for example, from Ciba Specialty Chemicals as IRGACURE 1700, IRGACURE 1800, IRGACURE 1850, and DAROCUR 4265).

The binder precursor may comprise an effective amount of at least one thermal initiator; for example, in an amount of from 0.1, 1, or 3 percent by weight, up to 5, 7, or even 10 percent by weight, or more. Exemplary thermal free-radical initiators include: azo compounds such as, for example, 2,2'-azo-bisisobutyronitrile, dimethyl 2,2'-azobis(isobutyrate), azobis(diphenyl methane), 4,4'-azobis-(4-cyanopentanoic acid), (2,2'-azobis(2,4-dimethylvaleronitrile (available as VAZO 52 from E.I. du Pont de Nemours and Co. of Wilmington, De.); peroxides such as, for example, benzoyl peroxide, cumyl peroxide, tert-butyl peroxide, cyclohexanone peroxide, glutaric acid peroxide, and dilauryl peroxide; hydrogen peroxide; hydroperoxides such as, for example, tert butyl hydroperoxide and cumene hydroperoxide; peracids such as, for example, peracetic acid and perbenzoic acid; potassium persulfate; and peresters such as, for example, diisopropyl percarbonate.

In some embodiments, it may be desirable to include one or more monoethylenically unsaturated free-radically polymerizable compounds in the binder precursor; for example, to reduce viscosity and/or or reduce crosslink density in the resultant binder. Exemplary monoethylenically unsaturated free-radically polymerizable compounds include: mono (meth)acrylates include hexyl (meth)acrylate, 2-ethylhexyl acrylate, isononyl (meth)acrylate, isobornyl (meth)acrylate, phenoxyethyl (meth)acrylate, 2-hydroxyethyl (meth)acrylate, dodecyl (meth)acrylate, methyl (meth)acrylate, ethyl (meth)acrylate, n-propyl (meth)acrylate, n-butyl (meth)acrylate, n-octyl (meth)acrylate, isobutyl (meth)acrylate, cyclohexyl (meth)acrylate, or octadecyl (meth)acrylate; N-vinyl compounds such as, for example, N-vinylformamide, N-vinylpyrrolidinone, or N-vinylcaprolactam; and combinations thereof.

In some instances, the abrasive composites may be formed from a slurry comprising the ceria abrasive particles, the surface treated nano-ceria filler particles, and a polymeric binder or polymeric binder precursor. In some embodiments, the nano-ceria filler particles and ceria abrasive particles comprise, on a volume basis, no more than about 70% of the abrasive composite, preferably no more than about 50% of the abrasive composite. In some embodiments, the volume fraction of abrasive particles relative to the volume fraction of abrasive particles and filler particles in the abrasive composite is no greater than about 0.90, preferably no greater than 0.75.

In some embodiments, the polymeric binder or polymeric binder precursor comprises at least about 10% of the abrasive composite, at least about 20% of the abrasive composite, at least about 30% of the abrasive composite, at least about 40% of the abrasive composite, or at least about 50% of the abrasive composite, on a volume basis. In certain embodiments, the polymeric binder or polymeric binder precursor comprises at most about 90% of the abrasive composite, at most about 80% of the abrasive composite, at most about 70% of the abrasive composite, at most about 60% of the abrasive composite, or at most about 50% of the abrasive composite, on a volume basis.

The matrix material and polymeric binder may include other additives such as abrasive particle surface modification additives, dispersants, passivating agents, water soluble additives, water sensitive agents, coupling agents, expanding agents, fibers, antistatic agents, reactive diluents, initiators, suspending agents, lubricants, wetting agents, surfactants, dyes, UV stabilizers, complexing agents, chain transfer agents, accelerators, catalysts, or activators. For the purpose of calculating volume ratios, these compounds are considered to be part of the polymeric binder and matrix material volume. The amounts of these additives may be readily selected by one skilled in the art, guided by this disclosure, to provide the desired properties.

Optional Backing, Adhesive and Subpad

In certain embodiments, the structured fixed abrasive article may further include a backing having a first major surface and a second major surface, and a plurality of abrasive composites distributed on the first major surface of the backing. In some embodiments, the backing may be substantially opaque. In other exemplary embodiments, the backing may be transparent or translucent.

A variety of backing materials are suitable for this purpose, including both flexible backings and backings that are more rigid. The backing may be selected from a group of materials which have been used previously for abrasive articles, for example paper, nonwoven materials, cloth, treated cloth, polymeric film, primed polymeric film, metal foil, treated versions thereof, and combinations thereof. One preferred type of backing may be a polymeric film. Examples of such polymeric films include polyester films, co-polyester films, microvoided polyester films, polyimide films, polyamide films, polyvinyl alcohol films, polypropylene film, polyethylene film, and the like. In a presently preferred embodiment, the backing may be a primed polyester film.

The thickness of the polymeric film backing generally may be from about 20 micrometers, preferably from about 50 micrometers, most preferably from about 60 micrometers; and may range to about 1,000 micrometers, more preferably to about 500 micrometers, and most preferably to about 200 micrometers. At least one surface of the backing may be coated with a matrix material and abrasive particles. In certain embodiments, the backing may be uniform in thickness. If the backing is not sufficiently uniform in thickness, greater variability in wafer polishing uniformity may result in the CMP process.

In general, when the abrasive article includes a backing, abrasive particles may be dispersed in a matrix material including a polymeric binder and nanoparticulate inorganic filler particles to form three-dimensional abrasive composites which are fixed, adhered, or bonded to the backing.

The polymeric binder used to bond the abrasive composites to an optional backing may be the same as or different from the polymeric binder used to form the abrasive composites. In some embodiments, the polymeric binder used to bond or form the abrasive composites may be a thermoplastic polymeric binder or thermosetting polymeric binder. If the polymeric binder is a thermosetting polymeric binder, the polymeric binder may preferably be formed from a polymeric binder precursor. Specifically, suitable polymeric binder precursors are, in an uncured state, flowable.

In certain additional embodiments, the fixed abrasive article includes an adhesive suitable for attaching the fixed abrasive article to a polishing machine. Optionally, the adhesive may be a pressure-sensitive adhesive. Preferably, the adhesive is provided on the back surface of the backing, that is, the major side surface opposite the major side surface coated with abrasive particles dispersed in a matrix material to form three-dimensional abrasive composites. In some embodiments, the fixed abrasive article with an optional backing, may be attached to or used in conjunction with a subpad. Preferred subpads include rigid and/or resilient elements. Suitable subpads are described in U.S. Pat. Nos. 5,692,950 and 6,007,407, the entire disclosure of each being incorporated herein by reference.

Abrasive Composite Configuration

The individual abrasive composite shape may have the form of any of a variety of geometric solids. Preferred abrasive composites may be precisely shaped (as defined above) or irregularly shaped, with precisely shaped composites being preferred. Typically, the abrasive composite is formed such that the base of the abrasive composite, for example, that portion of the abrasive composite in contact with a backing, has a larger surface area than that portion of the abrasive composite distal from the base or backing. The shape of the composite may be selected from among a number of geometric solids such as a cubic, cylindrical, prismatic, rectangular pyramidal, truncated pyramidal, conical, hemispherical, truncated conical, cross, or post-like cross sections with a distal end. Composite pyramids may have four sides, five sides or six sides. The abrasive composites may also have a mixture of different shapes. The abrasive composites may be arranged in rows, in concentric circles, in helices, or in lattice fashion, or may be randomly placed.

The sides forming the abrasive composites may be perpendicular relative to the backing, tilted relative to the backing or tapered with diminishing width toward the distal end. If the sides are tapered, it may be easier to remove the abrasive composite from the cavities of a mold or production tool. The tapered angle may range from about 1 degree, preferably from about 2 degrees, more preferably from about 3 degrees, and most preferably from about 5 degrees at the low end; to about 75 degrees, preferably to about 50 degrees, more preferably to about 35 degrees, and most preferably to about 15 degrees on the high end. The smaller angles are preferred because this results in a consistent nominal contact area as the composite wears. Thus, in general, the taper angle may be a compromise between an angle large enough to facilitate removal of the abrasive composite from a mold or production tool and small enough to create a uniform cross sectional area. An abrasive composite with a cross section that may be larger at the distal end than at the backing may also be used, although fabrication may require a method other than simple molding.

The height of each abrasive composite may be preferably the same, but it may be possible to have composites of varying heights in a single abrasive article. The height of the composites with respect to the backing or to the land between the composites generally may be less than about 2,000 micrometers, and more particularly in the range of from about 25 micrometers to about 200 micrometers. The base dimension of an individual abrasive composite may be about 5,000 micrometers or less, preferably about 1,000 micrometers or less, more preferably less than 500 micrometers. The base dimension of an individual abrasive composite is preferably greater than about 50 micrometers, more preferably greater than about 100 micrometers. The base of the abrasive composites may abut one another, or may be separated from one another by some specified distance.

In some embodiments, the physical contact between adjacent abrasive composites involves no more than 33% of the vertical height dimension of each contacting composite. More preferably, the amount of physical contact between the abutting composites may be in the range of about 1% to about 25% of the vertical height of each contacting composite. This definition of abutting also covers an arrangement where adjacent composites share a common abrasive composite land or bridge-like structure which contacts and extends between facing sidewalls of the composites. Preferably, the land structure has a height of no greater than about 33% of the vertical height dimension of each adjacent composite. The abrasive composite land may be formed from the same slurry used to form the abrasive composites. The composites are "adjacent" in the sense that no intervening composite may be located on a direct imaginary line drawn between the centers of the composites. It may be preferred that at least portions of the abrasive composites be separated from one another so as to provide the recessed areas between the raised portions of the composites.

The linear spacing of the abrasive composites may range from about 1 abrasive composite per linear cm to about 200 abrasive composites per linear cm. The linear spacing may be varied such that the concentration of composites may be greater in one location than in another. For example, the concentration may be greatest in the center of the abrasive article. The areal density of the composite may range, in some embodiments, from about 1 to about 40,000 composites/cm$^2$. It may be also feasible to have areas of the backing exposed, i.e. where the abrasive coating does not cover the entire surface area of the backing. This type of arrangement is further described in U.S. Pat. No. 5,014,468 (Ravipati et al.).

The abrasive composites are preferably set out on a backing in a predetermined pattern or set out on a backing at a predetermined location. For example, in the abrasive article made by providing slurry between the backing and a production tool having cavities therein, the predetermined pattern of the composites will correspond to the pattern of the cavities on the production tool. The pattern may be thus reproducible from article to article.

In one embodiment of a predetermined pattern, the abrasive composites are in an array or arrangement, by which may be meant that the composites are in a regular array such as aligned rows and columns, or alternating offset rows and columns. If desired, one row of abrasive composites may be directly aligned in front of a second row of abrasive composites. Preferably, one row of abrasive composites may be offset from a second row of abrasive composites.

In another embodiment, the abrasive composites may be set out in a "random" array or pattern. By this it may be meant that the composites are not in a regular array of rows and columns as described above. For example, the abrasive composites may be set out in a manner as described in WO PCT 95/07797 published Mar. 23, 1995 (Hoopman et al.) and WO PCT 95/22436 published Aug. 24, 1995 (Hoopman et al.). It may be understood, however, that this "random" array may be a predetermined pattern in that the location of the composites on the abrasive article may be predetermined and corresponds to the location of the cavities in the production tool used to make the abrasive article.

The three-dimensional, textured, abrasive article also may have a variable abrasive coating composition. For example, the center of an abrasive disc may contain an abrasive coating that may be different (e.g., softer, harder, or more or less erodible) from the outer region of the abrasive disc. Similarly, the coating composition may vary across an abrasive web. Such variation may be continuous or it may occur in discrete steps.

Methods of Making Structured Fixed Abrasive Articles in CMP

In another aspect, the present disclosure relates to methods of making a structured fixed abrasive article comprising:

dispersing the plurality of surface treated ceria filler particles having a volume mean diameter less than 100 nanometers in a precursor to the polymeric binder;

dispersing the plurality of ceria abrasive particles having a volume mean diameter from 100 to 500 nanometers in the precursor to the polymeric binder;

forming the plurality of three-dimensional abrasive composites from a mixture of the surface treated ceria filler particles and the ceria abrasive particles in the precursor to the polymeric binder; and curing the plurality of three-dimensional abrasive composites, thereby forming the polymeric binder comprising the matrix material of the structured fixed abrasive article.

In some presently preferred embodiments, forming the plurality of three-dimensional abrasive composites further comprises forming a layer of the mixture on a backing, and contacting the layer with a production tool having a plurality of precisely-shaped cavities, thereby forming the plurality of three-dimensional abrasive composites.

In some exemplary embodiments, the surface treated ceria filler particles have a surface treatment selected from silanes, titanates, zirconates, organophosphates, organosulfonates, polyether acids, reaction products of components comprising a carboxylic (meth)acrylate and a poly(meth)acrylate, and combinations thereof. In certain exemplary embodiments, one or both of the surface treatment and the polymeric binder comprises a reaction product of beta-carboxyethyl acrylate, optionally wherein one or both of the surface treatment and the polymeric binder further comprises a reaction product of a mono(meth)acrylate.

In certain exemplary embodiments, the precursor to the polymeric binder further comprises a free-radical photoinitiator, and curing the plurality of three-dimensional abrasive composites comprises radiation curing of the precursor to the polymeric binder. In some additional exemplary embodiments, the precursor to the polymeric binder further comprises a free-radical thermal initiator, and curing the plurality of three-dimensional abrasive composites comprises thermally post-curing the matrix material. In further exemplary embodiments, dispersing the plurality of surface treated ceria filler particles in the precursor to the polymeric binder occurs before dispersing the plurality of ceria abrasive particles in the precursor to the polymeric binder.

Methods of Using Structured Fixed Abrasive Articles in CMP

In some embodiments, methods for using fixed abrasive articles in CMP are provided. In general, the methods includes providing a substrate or wafer, contacting the substrate or wafer with a fixed abrasive article comprising a plurality of three-dimensional abrasive composites, and relatively moving the substrate or wafer and the fixed abrasive article, optionally in the presence of a liquid medium. In one exemplary embodiment, the plurality of abrasive composites comprise a plurality of abrasive particles having a volume mean diameter less than 500 nanometers dispersed in a matrix material. The matrix material further comprises a polymeric binder and a plurality of dispersed inorganic filler particles having, in certain embodiments, a volume mean diameter no greater than 200 nanometers.

In an additional aspect, the present disclosure relates to a method of using a structured fixed abrasive article comprising:

providing a structured fixed abrasive article comprising a plurality of three-dimensional abrasive composites fixed to the abrasive article, wherein the abrasive composites comprise a plurality of ceria abrasive particles having a volume mean diameter from 100 to 500 nanometers (nm) in a matrix material, the matrix material comprising a polymeric binder and a plurality of surface treated ceria filler particles having a volume mean diameter less than 100 nanometers;

conditioning the plurality of three-dimensional abrasive composites by at least partially abrading the matrix material to expose at least a portion of the ceria abrasive particles, thereby producing a conditioned surface of the structured fixed abrasive article;

contacting a workpiece with the conditioned surface of the structured fixed abrasive article; and relatively moving the workpiece and the structured fixed abrasive article, optionally in the presence of a liquid medium.

In certain exemplary embodiments, at least partially abrading the matrix material to expose at least a portion of the ceria abrasive particles further comprises contacting the plurality of three-dimensional abrasive composites with a surface of a pad conditioner comprising a plurality of diamond particulates affixed in a composite matrix comprising metal, and relatively moving the structured fixed abrasive article and the pad conditioner. In some exemplary embodiments, the workpiece comprises a silicon wafer.

It may be an advantage of one or more embodiments of the present disclosure to make improved fixed abrasive articles for use in CMP processes. In some exemplary embodiments, the fixed abrasive articles may be useful in abrading a dielectric material. In other exemplary embodiments, the fixed abrasive articles may be useful in polishing metal layers, for example copper, aluminum or tungsten layers, deposited on a wafer. In certain exemplary embodiments, such fixed abrasive articles may be long lasting, e.g., the abrasive article may be able to process at least 5-20, and even 30 or more wafers. The abrasive articles, in some embodiments, may also provide a good dielectric material removal rate. Additionally, the abrasive articles may be capable, of yielding, in certain embodiments, a semiconductor wafer having an acceptable flatness, surface finish and minimal dishing.

In general, since there can be numerous process steps for a single semiconductor wafer, the semiconductor fabrication industry expects that the process will provide a relatively high removal rate of material. The material removal rate obtained with a particular abrasive article will typically vary depending upon the machine conditions and the type of wafer surface being processed. However, although it is typically desirable to have a high conductor or dielectric material removal rate, the conductor or dielectric material removal rate may be selected such that it does not compromise the desired surface finish and/or topography of the wafer surface.

Figure 2:
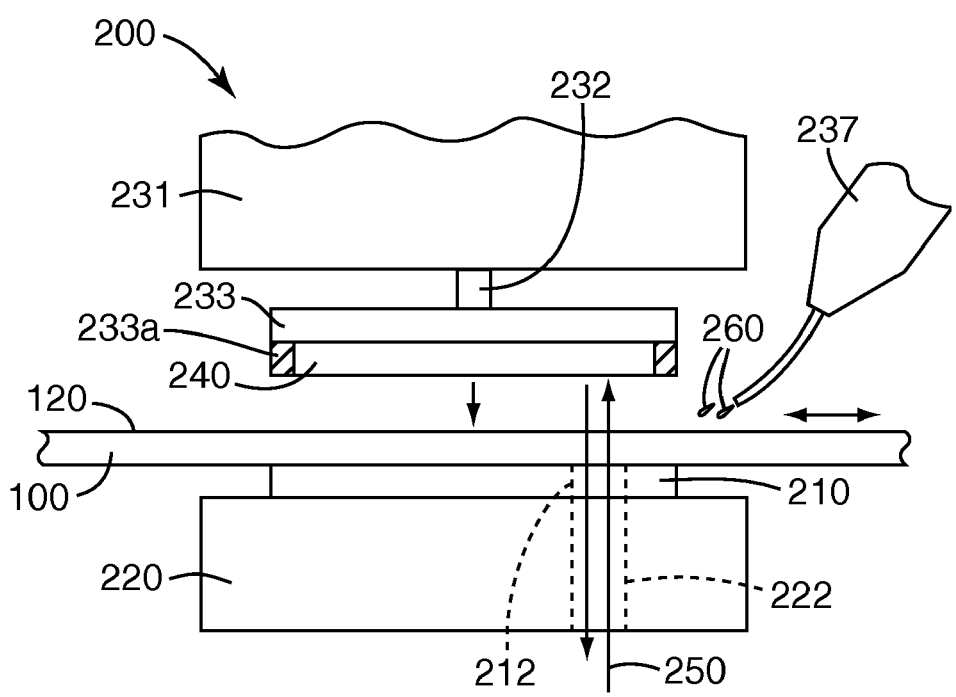
FIG. 2 is a schematic side view of a method of conditioning a surface of a wafer according to one exemplary embodiment of the present disclosure.

Referring now to FIG. 2, in one exemplary method of conditioning a surface of a wafer, structured abrasive article 100, preferably having a transparent or translucent backing, contacts and is secured to subpad 210, which is in turn secured to platen 220. Subpad 210, which may comprise a foam (e.g., a polyurethane foam) or other compressible material, has first window 212 therein, and platen 220 has second window 222 therein. Wafer holder 233 is mounted to a head unit 231 that is connected to a motor (not shown). Gimbal chuck 232 extends from head unit 231 to wafer holder 233. Wafer holder 233 helps secure wafer 240 to head unit 231 and also prevent the semiconductor wafer from becoming dislodged during planarization. Wafer holder 233 extends alongside of wafer 240 at ring portion 233*a*. Ring portion 233*a* (which is optional) may be a separate piece or may be integral with wafer holder 233. Wafer 240 is brought into contact with the abrasive layer 120 of structured abrasive article 100, and the wafer 240 and abrasive layer 120 are moved relative to one another.

The progress of polishing/abrading may be monitored using laser beam 250 which passes through second window 222, first window 212, and structured abrasive article 100 and is reflected off oxide surface 242 wafer 240 and then retraces its path. Optional working fluid 260 may be used to facilitate the abrading process. Reservoir 237 holds optional working fluid 260 which is pumped through tubing 238 into the interface between semiconductor wafer and the abrasive layer. Useful working fluids include, for example, those listed in U.S. Pat. No. 5,958,794 (Bruxvoort et al.).

In some exemplary embodiments, the workpiece or substrate comprises a silicon wafer. In general, wafer surface finishes that are substantially free of scratches and defects are desired. The surface finish of the wafer may be evaluated by known methods. One method is to measure the Rt value, which provides a measure of roughness, and may indicate scratches or other surface defects. The wafer surface is typically modified to yield an Rt value of no greater than about 0.4 nanometers, more typically no greater than about 0.2 nanometers, and even more typically no greater than about 0.05 nanometers. Rt is typically measured using a laser interferometer such as a Wyko RST PLUS interferometer (Wyko Corp., Tucson, Ariz.), or a Tencor profilometer (KLA-Tencor Corp., San Jose, Calif.). Scratch detection may also be measured by dark field microscopy. Scratch depths may be measured by atomic force microscopy.

Wafer surface processing may be conducted in the presence of a working fluid, which may be selected based upon the composition of the wafer surface. In some applications, the working fluid typically comprises water. The working fluid may aid processing in combination with the abrasive article through a chemical mechanical polishing process. During the chemical portion of polishing, the working fluid may react with the outer or exposed wafer surface. Then during the mechanical portion of processing, the abrasive article may remove this reaction product.

In certain exemplary embodiments, at least partially abrading the matrix material to expose at least a portion of the ceria abrasive particles further comprises contacting the plurality of three-dimensional abrasive composites with a surface of a pad conditioner comprising at least one of diamond particulates or chemical vapor deposited diamond, and relatively moving the structured fixed abrasive article and the pad conditioner.

Structured abrasive articles according to the present disclosure may be conditioned, for example, by abrading the surface using a pad conditioner (e.g., with diamond particulates held in a metal matrix, or with a surface comprising chemical vapor deposited diamond) prior to and/or intermittently during the wafer planarization process. One useful conditioner is a CMP pad conditioner (typically mounted on a rigid backing plate), part no. CMP-20000TS, available from Morgan Advanced Ceramics of Hayward, Calif.

CMP Process Operating Conditions

As noted above, structured abrasive articles according to the present disclosure may be used for abrading and/or polishing wafers containing silicon (e.g., silicon wafers, glass wafers, etc.) including those having an oxide layer on an outer surface thereof. For example, the structured abrasive articles may be useful in abrading and/or polishing a dielectric material deposited on the wafer and/or the wafer itself. Variables that affect the wafer polishing rate and characteristics include, for example, the selection of the appropriate contact pressure between the wafer surface and abrasive article, type of working fluid, relative speed and relative motion between the wafer surface and the abrasive article, and the flow rate of the working fluid. These variables are interdependent, and are typically selected based upon the individual wafer surface being processed.

In some exemplary embodiments, the structured fixed abrasive articles of the present disclosure may be useful in abrading and/or polishing metal layers, for example copper, aluminum or tungsten layers, deposited on a wafer. In other exemplary embodiments, the fixed abrasive articles may be useful in abrading and/or polishing a dielectric material deposited on the wafer and/or the wafer itself. Variables that affect the wafer polishing rate and characteristics include, for example, the selection of the appropriate contact pressure between the wafer surface and abrasive article, type of liquid medium, relative speed and relative motion between the wafer surface and the abrasive article, and the flow rate of the liquid medium. These variables are interdependent, and are selected based upon the individual wafer surface being processed.

In general, since there can be numerous process steps for a single semiconductor wafer, the semiconductor fabrication industry expects that the process will provide a relatively high removal rate of material. In some embodiments, the material removal rate may be at least 100 angstroms per minute (Å/min.), preferably at least 500 Å/min., more preferably at least 1,000 Å/min., and most preferably at least 1500 Å/min. In some instances, it may be desirable for the conductive material removal rate to be at least 2,000 Å/min., or in certain embodiments, 3,000 or even 4,000 Å/min. The material removal rate obtained with a particular abrasive article may vary depending upon the machine conditions and the type of wafer surface being processed. However, although it may be generally desirable to have a high conductor or dielectric material removal rate, the conductor or dielectric material removal rate may be selected such that it does not compromise the desired surface finish and/or topography of the wafer surface.

In general, wafer surface finishes that are substantially scratch and defect free are preferred. The surface finish of the wafer may be evaluated by known methods. One preferred method may be to measure the Rt value of the wafer surface which provides a measure of roughness, and may indicate scratches or other surface defects. The wafer surface may be preferably modified to yield an Rt value of no greater than about 4,000 angstroms (Å), more preferably no greater than about 2,000 Å, and even more preferably no greater than about 500 Å. Rt is be typically measured using an interferometer such as a Wyko RST PLUS interferometer (Wyko Corp., Tucson, Ariz.), or a TENCOR profilometer (KLA-TENCOR Corp., San Jose, Calif.). Scratch detection may also be measured by dark field microscopy. Scratch depths may be measured by atomic force microscopy.

Applicant has discovered that fixed abrasive articles according to the present disclosure, when used in methods according to the disclosure, provide a good conductive material removal rate at an exemplified interface pressure. Also, two or more processing conditions within a planarization process may be used. For example, a first processing segment may comprise a higher interface pressure than a second processing segment. Rotation and translational speeds of the wafer and/or the abrasive article also may be varied during the abrading process. In some embodiments, the abrasive article may be used in a multi-step abrading process. For example, in some exemplary multi-step abrading processes, the fixed abrasive may be used in the first step, in one or more subsequent steps, or in all steps. In other exemplary embodiments, one or more of the steps may include an abrasive slurry used either with or in the absence of the fixed abrasive article.

Wafer surface processing may be conducted in the presence of a working liquid, which may be selected based upon the composition of the wafer surface. In some applications, the working liquid typically comprises water. The working liquid may aid processing in combination with the abrasive article through a chemical mechanical polishing process. During the chemical portion of polishing, the working liquid may react with the outer or exposed wafer surface. Then during the mechanical portion of processing, the abrasive article may remove this reaction product. During the processing of metal surfaces, it may be preferred that the working liquid may be an aqueous solution which includes a chemical etchant such as an oxidizing material or agent.

For example, chemical polishing of copper may occur when an oxidizing agent in the working liquid reacts with the copper to form a surface layer of copper oxides. The mechanical process occurs when the abrasive article removes this metal oxide from the wafer surface. Alternatively, the metal may first be removed mechanically and then react with ingredients in the working fluid. Suitable working liquids are described in Kaisaki et al. (U.S. Pat. No. 6,194,317).

Other useful chemical etchants include complexing agents. These complexing agents may function in a manner similar to the oxidizing agents previously described in that the chemical interaction between the complexing agent and the wafer surface creates a layer which may be more readily removed by the mechanical action of the abrasive composites.

One suitable working liquid comprises a chelating agent, an oxidizing agent, an ionic buffer, and a passivating agent in aqueous solution. One such exemplary working liquid may comprise, for example, $(NH_4)_2HPO_4$, hydrogen peroxide, ammonium citrate, 1-H-benzotriazole, and water. Typically, the solution may be used for polishing copper wafers. Another suitable working liquid comprises an oxidizing agent, an acid, and a passivating agent in aqueous solution. One such exemplary working solution may comprise, for example, hydrogen peroxide, phosphoric acid, 1-H-benzotriazole, and water.

The amount of the working liquid may be preferably sufficient to aid in the removal of metal or metal oxide deposits from the surface. In many instances, there may be sufficient liquid from the basic working liquid and/or the chemical etchant. However, in some instances it may be preferred to have a second liquid present at the planarization interface in addition to the first working liquid. This second liquid may be the same as the first liquid, or it may be different.

EXAMPLES

Exemplary embodiments of the present invention have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims. Furthermore, notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Example 1

Preparation of Surface Treated Nano-Ceria Filler Particles

A ceria dispersion (10000 grams, 30.1 percent solids in water, 45 nm average primary particle size, available from Rhodia, Inc., Cranberry, N.J.) was poured into a mixing vessel and then 72.41 grams of 2-(2-methoxyethoxy)ethoxyacetic acid, 58.57 grams of beta-carboxyethyl acrylate, and 5625 grams of 1-methoxy-2-propanol were slowly added while mixing using a polytetrafluoroethylene-coated blade. The mixture was heated to 50° C. and was mixed overnight. The mixture was then transferred into a rotary evaporator and excess water was removed under reduced pressure. The resultant dispersion had a solids content of 41.79 percent by weight.

Example 2

Preparation of A Mixture of Surface Treated Nano-Ceria Filler Particles and Ceria Abrasive Particles in a Polymeric Binder Precursor Into a mixing vessel were mixed 660.7 grams of the surface treated nano-ceria dispersion of Example 1 @48.43% solids by weight, and 6.4 grams of Disperbyk-111 wetting and dispersing additive (available from BYK-Chemie USA, Inc. of Wallingford, Conn.), to form Preparatory Dispersion 1. In a separate mixing vessel, 158.2 g of aqueous ceria abrasive dispersion (165 nm average primary particle size, available as SRS729 from Ferro Corp. of Cleveland, Ohio) was mixed with 1.6 g of Disperbyk-111 (from BYK-Chemie, U.S.A. of Wallingford, Conn.) to form Preparatory Dispersion 2. After combining Preparatory Dispersion 1 with Preparatory Dispersion 2, 3.33 grams of 2-hydroxyethyl methacrylate (available from Rohm and Haas Co. of Philadelphia, Pa.), 16.72 grams of 2-phenoxyethyl acrylate (available as SR 339 from Sartomer Co.), 74.25 grams of trimethylolpropane triacrylate (available as SR 351 from Sartomer Co.), 4.53 grams of beta-carboxyethyl acrylate (available from Bimax Inc. of Cockeysville, Md.), and 0.5 gram of phenothiazine (available from Avecia, Inc. of Manchester England) dissolved in 20 grams of 1-methoxy-2-propanol.

The mixture was mixed using a polytetrafluoroethylene-coated blade for 30 minutes, then transferred to a rotary evaporator to remove the 1-methoxy-2-propanol. The slurry was cooled to room temperature, and then 0.63 gram of free-radical photoinitiator (phenyl bis(2,4,6-trimethylbenzoyl) phosphine oxide, available as IRGACURE 819 from Ciba Specialty Chemicals of Tarrytown, N.Y.), 0.20 gram of thermal free-radical initiator (2,2'-azobis(2,4-dimethylvaleronitrile, available as VAZO 52 from E.I. du Pont de Nemours and Co. of Wilmington, De.) and 0.20 gram of hydroquinone monomethyl ether were added, followed by mixing for two hours.

Comparative Example 1

Preparation of Nano-Ceria Filler Particles in a Polymeric Binder Precursor

Into a mixing vessel were mixed 2034.0 g of the surface treated nano-ceria dispersion from Example 1 at a percent solids of 41.79%, 12.8 g of Disperbyk-111 (from BYK-Chemie, U.S.A. of Wallingford, Conn.). To this mixture was added 6.24 g of 2-hydroxyethyl methacrylate (available from Rohm and Haas Co. of Philadelphia, Pa.), 88.97 g of 2-phenoxyethyl acrylate (available as SR 339 from Sartomer Co.), 48.00 g of trimethyolopropane (available as SR 351 from Sartomer Co.), 6.806 g of β-carboxyethylacrylate (available from Bimax Inc. of Cockeysville, Md.), and 0.75 g of phenothiazine (available from Avecia, Inc. of Manchester England) dissolved in 50 g of 1-methoxy-2-propanol.

The mixture was mixed using a polytetrafluoroethylene-coated blade for 30 minutes, then transferred to a rotary evaporator to remove the 1-methoxy-2-propanol. The slurry was cooled to room temperature, and then 0.18 gram of free-radical photoinitiator (phenyl bis(2,4,6-trimethylbenzoyl) phosphine oxide, available as IRGACURE 819 from Ciba Specialty Chemicals of Tarrytown, N.Y.), 0.18 gram of thermal free-radical initiator (2,2'-azobis(2,4-dimethylvaleronitrile, available as VAZO 52 from E.I. du Pont de Nemours and Co. of Wilmington, De.) and 0.09 gram of hydroquinone monomethyl ether were added, followed by mixing for two hours.

Preparation of Structured Fixed Abrasive Articles

A polypropylene production tool, approximately 50 cm by 50 cm (20 inches by 20 inches), was provided that comprised a series of cavities arranged in a predetermined array with the specified dimensions of a three-sided pyramids having a height of 63 μm and each side, although not being identical, having a width of about 125 micrometers (μm), and corner angles of 55.5 degrees, 59 degrees and 55.5 degrees. The production tool was essentially the inverse of the desired shape, dimensions and arrangement of the abrasive composites. The production tool was secured to a metal carrier plate using a masking type pressure sensitive adhesive tape.

The abrasive slurry was coated into the cavities of the production tool using a rubber squeegee such that the abrasive slurry completely filled the cavities. Next, 0.127 millimeter (5 mil, 125 μm) thick primed polyester (PET) backing was brought into contact with the abrasive slurry contained in the cavities of the production tool. The backing, abrasive slurry and production tool secured to the metal carrier plate, were passed through a bench top laboratory laminator from Chem Instruments (Model #001998). The article was continuously fed between two rubber rollers at a pressure of about 210-420 Pa (30-60 psi) and a speed of about 1 cm/sec.

Pressure adjustments were made depending on the general quality of the coating. A quartz plate, about 6.3 mm (¼ inch) thick was then placed on top of the backing covering the entire backing. The article was cured by passing the metal carrier plate, tool, abrasive slurry, backing and quartz plate under two ultraviolet light lamps ("V" bulb, available from Fusion Systems Inc.) that operated at about 157.5 Watts/cm (400 Watts/inch). The radiation passed through the quartz plate and PET backing. The speed was about 4.4 meters/minute (15 feet/minute) and the sample was passed under the lamps twice at the identical process conditions. The abrasive article was removed from the production tooling by gently pulling on the PET backing.

Example 3

Preparation of Structured Fixed Abrasive Article Comprising a Mixture of Surface Treated Nano-Ceria Filler Particles and Ceria Abrasive Particles The mixture of Example 2 was used to prepare a structured fixed abrasive web article according to the above-described method of making a structured fixed abrasive article.

Comparative Example 2

Preparation of Structured Fixed Abrasive Article Comprising Only Surface Treated Nano-Ceria Particles The mixture of Comparative Example 1 was used to prepare a structured fixed abrasive web article according to the same procedure used to prepare Example 3.

Wafer Polishing Examples

Substrate removal rates for the following Examples were calculated by determining the change in thickness of the layer being polished from the initial (i.e., before polishing) thickness and the final (i.e., after polishing) thickness. Thickness measurements are made using a Tencor OmniMap NC110 Non-Contacting Metals Monitoring System from Tencor Instruments, Prometrix Division, Santa Clara, Calif. Five points were measured per wafer; one in the center of the wafer and four spaced at 90 degree intervals near the outer diameter of the wafer approximately 8.9 cm (3.5 inches) from the center of the wafer.

Example 5

The fixed abrasive web (Example 3) made by blending the surface treated nano-ceria filler and sub-micrometer size ceria abrasive particles to form a mixture in a polymeric binder precursor (Example 2) was used to polish thermal oxide blanket wafers (200 mm diameter silicon wafers with a 1 micrometer film thickness of silicon oxide on its surface) using a CMP polisher available under the trade designation REFLEXION polisher from Applied Materials, Inc. of Santa Clara, Calif. equipped with a subpad (60/90 SMOOTH SUBPAD available from 3M Company, St. Paul, Minn.) using a wafer pressure of 1.5 pounds per square inch (1.5 kPa), a platen speed of 30 revolutions per minute, and a web index speed of 5 millimeters for 1 minute. A working fluid (deionized water containing 2.5 weight percent L-proline adjusted to a pH of 10.5 with potassium hydroxide, flow rate of 100 milliliters per minute) was used during the polishing process.

In Example 5, the web of Example 3 was not conditioned prior to use. The polishing performance for Example 5 on ten thermal oxide blanket wafers is reported in FIG. 3. The removal rates averaged 467 Å/min with a profile of slower in the middle and fast at the edge of the wafer and a standard deviation of 281 Å/min.

Example 6

The fixed abrasive web (Example 3) made by blending the surface treated nano-ceria filler and sub-micrometer size ceria abrasive particles to form a mixture in a polymeric binder precursor (Example 2) was used as in Example 5, except that before polishing the thermal oxide blanket wafers, the web of Example 3 was first conditioned in situ using a pad conditioner comprising chemical vapor deposited (CVD) diamond (available as CMP—20000TS from Morgan Advanced Ceramics of Allentown, Pa.) for 60 seconds, at a platen speed of 30 rpm, 5 sweep/min, from 2.75 to 12.50 inch across the web, and a working fluid (deionized water containing 2.5 weight percent L-proline adjusted to a pH of 10.5 with potassium hydroxide) flow rate of 100 milliliters per minute.

Figure 4:
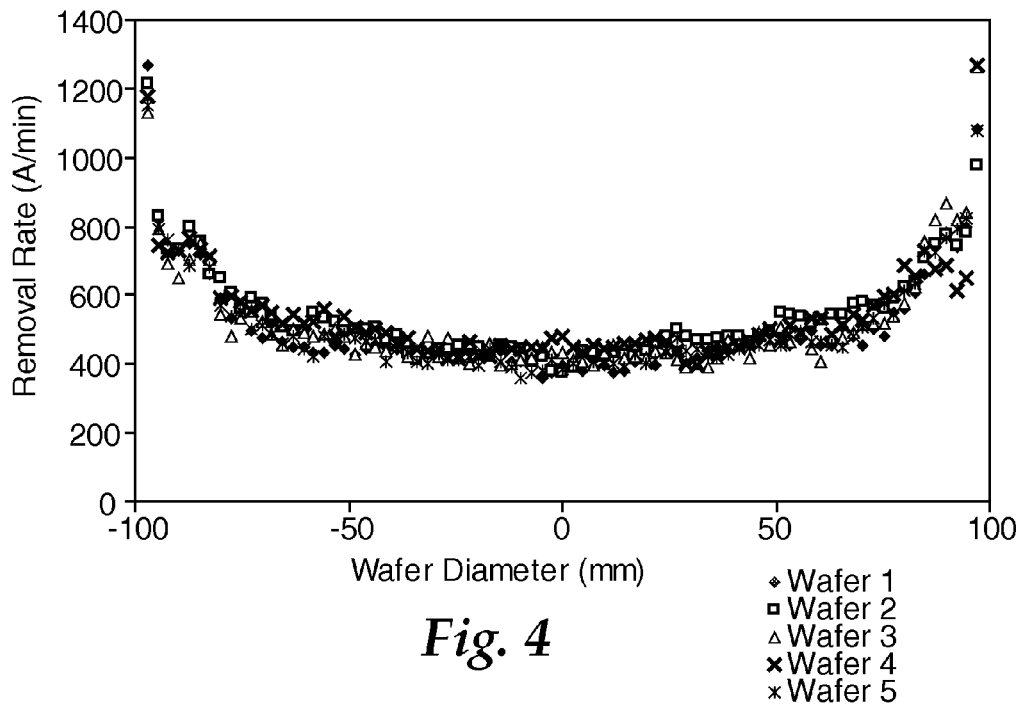
FIG. 4 is another graph showing silicon wafer polishing performance using an exemplary structured fixed abrasive article according to one exemplary embodiment of the present disclosure.

The polishing performance for Example 6 for five thermal oxide blanket wafers, after conditioning (as above), is reported in FIG. 4. The removal rates and profiles across wafer diameter are shown for various wafers in FIG. 4. The removal rates averaged at 524 Å /min with a more uniform profile and a standard deviation of 150 Å/min.

Comparative Example 3

Figure 5:
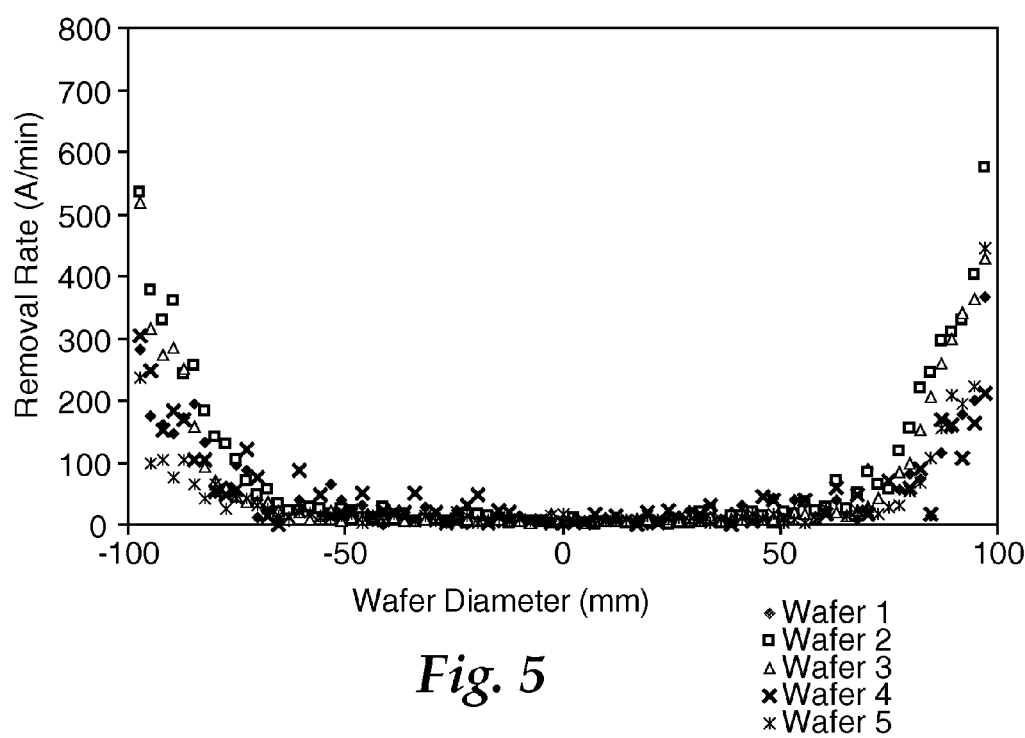
FIG. 5 is a graph showing silicon wafer polishing performance using a structured fixed abrasive article comprising surface treated nano-ceria filler according to a comparative example.

The surface treated nano-ceria structured fixed abrasive web of Comparative Example 1 was used as in Example 5, except that Example 3 was replaced by Comparative Example 1. Comparative Example 1 was not conditioned prior to use. The polishing performance of Comparative Example 1, tested on five thermal oxide blanket wafers, is reported in FIG. 5. The removal rates were nearly zero except at the edge of the wafers.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g. 1 to 5 includes 1, 1.5, 2, 2.75, 3, 3.80, 4, and 5). In addition, all numbers used herein are assumed to be modified by the term 'about'. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

We claim:

1. A structured fixed abrasive article comprising:
    a plurality of three-dimensional abrasive composites fixed to the abrasive article, wherein the abrasive composites comprise a plurality of ceria abrasive particles having a volume mean diameter from 100 to 500 nanometers (nm) in a matrix material, the matrix material comprising a polymeric binder and a plurality of surface treated ceria filler particles having a volume mean diameter less than 100 nm.

2. The structured fixed abrasive article of claim 1, wherein the ceria abrasive particles have a volume mean diameter from 100 to 200 nm.

3. The structured fixed abrasive article of claim 1, wherein the surface treated ceria filler particles have a volume mean diameter no greater than 25 nm.

4. The structured fixed abrasive article of claim 1, wherein the polymeric binder comprises the reaction product of one or more (meth)acrylic monomers.

5. The structured fixed abrasive article of claim 1, wherein the surface treated ceria filler particles have a surface treatment selected from silanes, titanates, zirconates, organophosphates, organosulfonates, polyether acids, reaction products of components comprising a carboxylic (meth)acrylate and a poly(meth)acrylate, and combinations thereof.

6. The structured fixed abrasive article of claim 5, wherein one or both of the surface treatment and the polymeric binder comprises a reaction product of beta-carboxyethyl acrylate, optionally wherein one or both of the surface treatment and the polymeric binder further comprises a reaction product of a mono(meth)acrylate.

7. The structured fixed abrasive article of claim 1, wherein, based on a total weight of the abrasive composites, the ceria abrasive particles are present in an amount of at most 50 percent by weight.

8. The structured fixed abrasive article of claim 1, wherein, based on a total weight of the abrasive composites, the surface treated ceria filler particles are present in an amount of at least 10 percent by weight.

9. The structured fixed abrasive article of claim 1, wherein the shaped abrasive composites consist essentially of posts lengthwise oriented substantially perpendicular to a major surface of the structured fixed abrasive article.

10. The structured fixed abrasive article of claim 1, further comprising one or more of a backing, an adhesive, and a subpad.

11. A method of making the structured fixed abrasive article of claim 1, comprising:
    dispersing the plurality of surface treated ceria filler particles having a volume mean diameter less than 100 nanometers (nm) in a precursor to the polymeric binder;
    dispersing the plurality of ceria abrasive particles having a volume mean diameter from 100 to 500 nm in the precursor to the polymeric binder;
    forming the plurality of three-dimensional abrasive composites from a mixture of the surface treated ceria filler particles and the ceria abrasive particles in the precursor to the polymeric binder; and
    curing the plurality of three-dimensional abrasive composites, thereby forming the polymeric binder comprising the matrix material of the structured fixed abrasive article.

12. The method of claim 11, wherein forming the plurality of three-dimensional abrasive composites further comprises:
    forming a layer of the mixture on a backing; and
    contacting the layer with a production tool having a plurality of precisely-shaped
    cavities, thereby forming the plurality of three-dimensional abrasive composites.

13. The method of claim 12, wherein the surface treated ceria filler particles have a surface treatment selected from silanes, titanates, zirconates, organophosphates, organosulfonates, polyether acids, reaction products of components comprising a carboxylic (meth)acrylate and a poly(meth) acrylate, and combinations thereof.

14. The method of claim 13, wherein one or both of the surface treatment and the polymeric binder comprises a reaction product of beta-carboxyethyl acrylate, optionally wherein one or both of the surface treatment and the polymeric binder further comprises a reaction product of a mono (meth)acrylate.

15. The method of claim 11, further comprising a free-radical photoinitiator, and wherein said curing the plurality of three-dimensional abrasive composites comprises radiation curing of the precursor to the polymeric binder.

16. The method of claim 15, further comprising a free-radical thermal initiator, wherein said curing the plurality of three-dimensional abrasive composites comprises thermally post-curing the matrix material.

17. The method of claim 15, wherein dispersing the plurality of surface treated ceria filler particles in the precursor to the polymeric binder occurs before dispersing the plurality of ceria abrasive particles in the precursor to the polymeric binder.

18. A method of using the structured fixed abrasive article of claim 1, comprising:
    providing a structured fixed abrasive article comprising a plurality of three-dimensional abrasive composites fixed to the abrasive article, wherein the abrasive composites comprise a plurality of ceria abrasive particles having a volume mean diameter from 100 to 500 nanometers (nm) in a matrix material, the matrix material comprising a polymeric binder and a plurality of surface treated ceria filler particles having a volume mean diameter less than 100 nm;
    conditioning the plurality of three-dimensional abrasive composites by at least partially abrading the matrix material to expose at least a portion of the ceria abrasive particles, thereby producing a conditioned surface of the structured fixed abrasive article;
    contacting a workpiece with the conditioned surface of the structured fixed abrasive article; and
    relatively moving the workpiece and the structured fixed abrasive article, optionally in the presence of a liquid medium.

19. The method of claim 18, wherein the workpiece comprises a silicon wafer.

20. The method of claim 18, wherein at least partially abrading the matrix material to expose at least a portion of the ceria abrasive particles further comprises:
    contacting the plurality of three-dimensional abrasive composites with a surface of a pad conditioner comprising at least one of diamond particulates or chemical vapor deposited diamond; and
    relatively moving the structured fixed abrasive article and the pad conditioner.

* * * * *